(12) United States Patent
Carmel

(10) Patent No.: US 8,137,022 B2
(45) Date of Patent: Mar. 20, 2012

(54) COUPLING PIN AND METHOD OF USE THEREOF

(75) Inventor: Aviv Carmel, Hod Hasharon (IL)

(73) Assignee: Sky Line Cranes & Technologies Ltd, Bakran Industrial Zone (IL)

( * ) Notice: Subject to any disclaimer, the term of this patent is extended or adjusted under 35 U.S.C. 154(b) by 266 days.

(21) Appl. No.: 12/445,984

(22) PCT Filed: Oct. 18, 2007

(86) PCT No.: PCT/IL2007/001247
§ 371 (c)(1),
(2), (4) Date: Apr. 17, 2009

(87) PCT Pub. No.: WO2008/047362
PCT Pub. Date: Apr. 24, 2008

(65) Prior Publication Data
US 2010/0074674 A1    Mar. 25, 2010

(30) Foreign Application Priority Data
Oct. 19, 2006  (IL) .......................................... 178735

(51) Int. Cl.
*E02F 9/28*   (2006.01)
(52) U.S. Cl. ..................... 403/150; 403/185; 403/318
(58) Field of Classification Search .................. 403/150, 403/151, 154, 155, 157, 161, 185, 318, 379.2, 403/379.4; 411/75–80; 212/177
See application file for complete search history.

(56) References Cited

U.S. PATENT DOCUMENTS

| | | | | |
|---|---|---|---|---|
| 1,154,766 | A * | 9/1915 | Hartwig | 403/379.4 |
| 1,993,749 | A * | 3/1935 | Pleister | 411/76 |
| 2,172,976 | A * | 9/1939 | Johnson | 188/211 |
| 2,651,390 | A * | 9/1953 | Polanin | 188/221.1 |
| 2,748,594 | A * | 6/1956 | Edwards | 411/76 |
| 2,985,264 | A * | 5/1961 | Leonard, Jr. | 52/640 |
| 3,121,289 | A * | 2/1964 | Eyolfson | 37/456 |
| 3,204,514 | A * | 9/1965 | Sauvet | 411/385 |
| 3,362,734 | A * | 1/1968 | Downie | 403/356 |
| 3,494,481 | A * | 2/1970 | Smith | 213/69 |
| 3,511,388 | A | 5/1970 | Markwardt | |
| 3,877,828 | A * | 4/1975 | Smith | 403/358 |
| 4,187,035 | A * | 2/1980 | Colburn | 403/318 |
| 4,275,637 | A * | 6/1981 | Herb et al. | 411/78 |
| 4,312,611 | A * | 1/1982 | Herb | 411/9 |
| 4,427,327 | A * | 1/1984 | Herb | 411/78 |
| 4,886,406 | A * | 12/1989 | Herb | 411/78 |
| 4,892,450 | A * | 1/1990 | Gerhard | 411/78 |
| 5,000,610 | A | 3/1991 | Stuhr | |
| 5,368,344 | A * | 11/1994 | Plangetis | 285/412 |

(Continued)

FOREIGN PATENT DOCUMENTS
AU           716 828 B2      6/1997
(Continued)

*Primary Examiner* — Joshua Kennedy
(74) *Attorney, Agent, or Firm* — Oliff & Berridge, PLC

(57) ABSTRACT

A coupling pin (10) comprising a carriage member (12) and a riding member (14) longitudinally slidable over the carriage member. The carriage member and riding member being mutually inclined longitudinally, and together complementing each other to form a uniform pin. The pin may be inserted into an aperture such that the carriage member is first disposed therein, and a force subsequently applied to the riding member causing it to move longitudinally with respect to the carriage member, into a load-bearing position.

25 Claims, 15 Drawing Sheets

U.S. PATENT DOCUMENTS

| | | |
|---|---|---|
| 5,417,518 A | 5/1995 | Bierwith |
| 5,529,424 A | 6/1996 | Neubert et al. |
| 5,617,655 A * | 4/1997 | Launder et al. ............... 37/457 |
| 5,651,650 A * | 7/1997 | Herb et al. ................... 411/78 |
| 5,700,119 A * | 12/1997 | Wakai ........................ 411/78 |
| 5,784,813 A | 7/1998 | Balassa et al. |
| 7,174,661 B2 * | 2/2007 | Briscoe ....................... 37/455 |

FOREIGN PATENT DOCUMENTS

| | | |
|---|---|---|
| EP | 0 116 161 A1 | 8/1984 |
| EP | 0 720 961 A2 | 7/1996 |
| GB | 1093679 | 12/1967 |

* cited by examiner

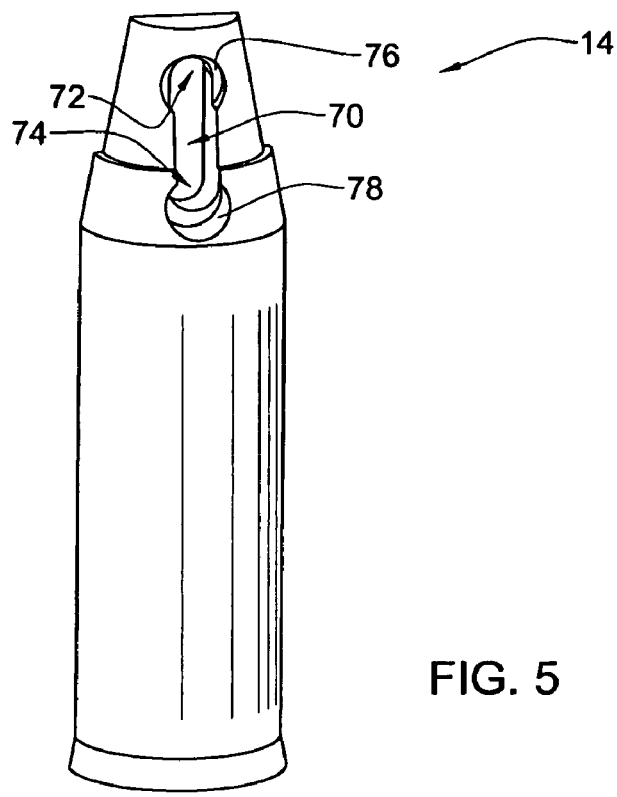
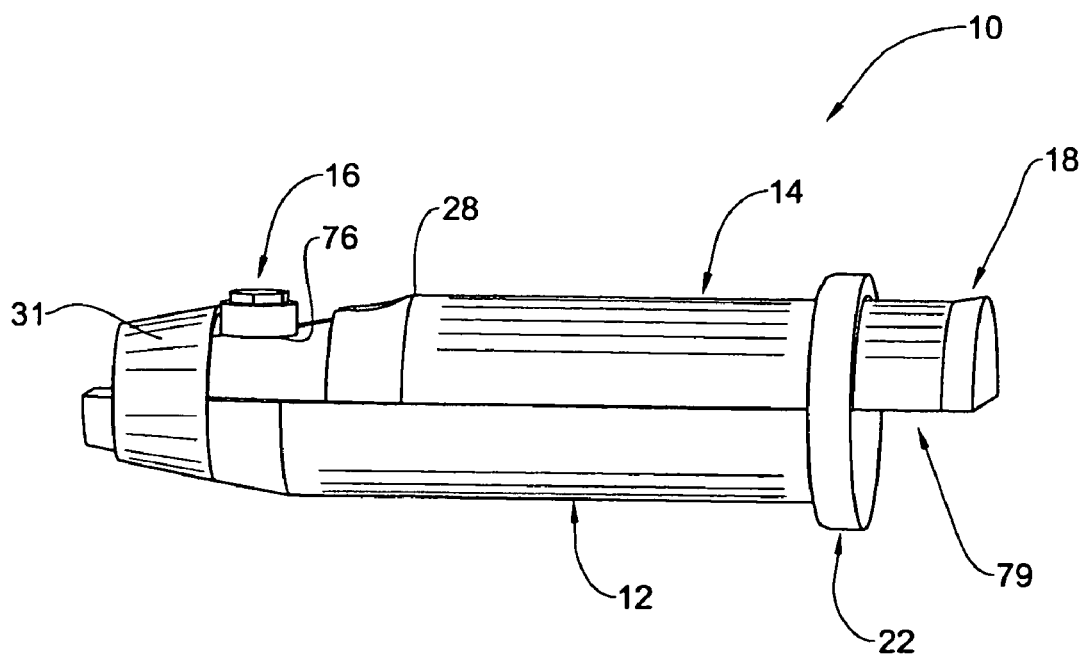

FIG. 16
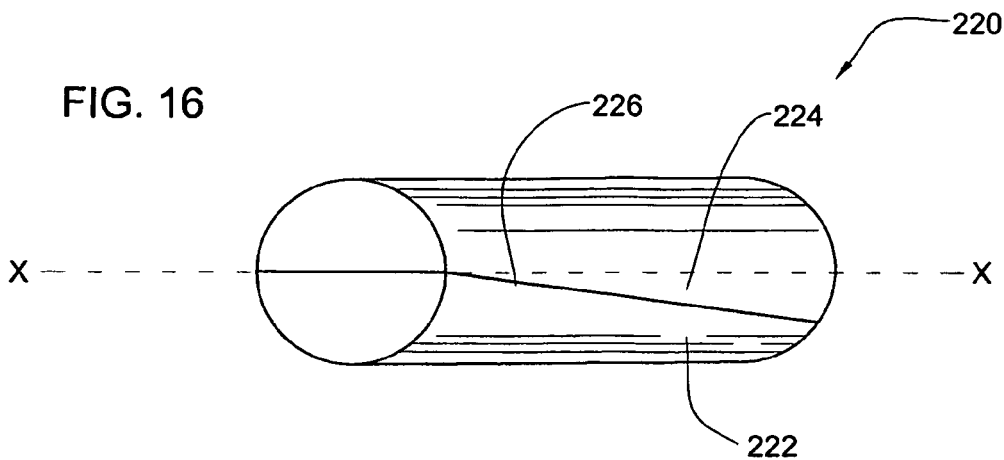
FIG. 17A
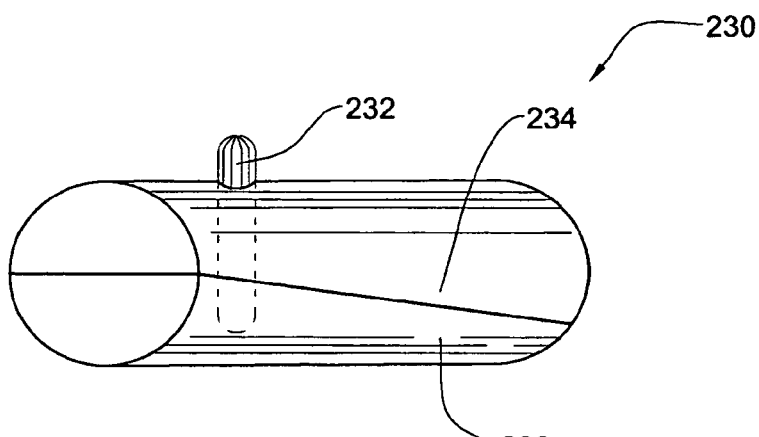
FIG. 17B
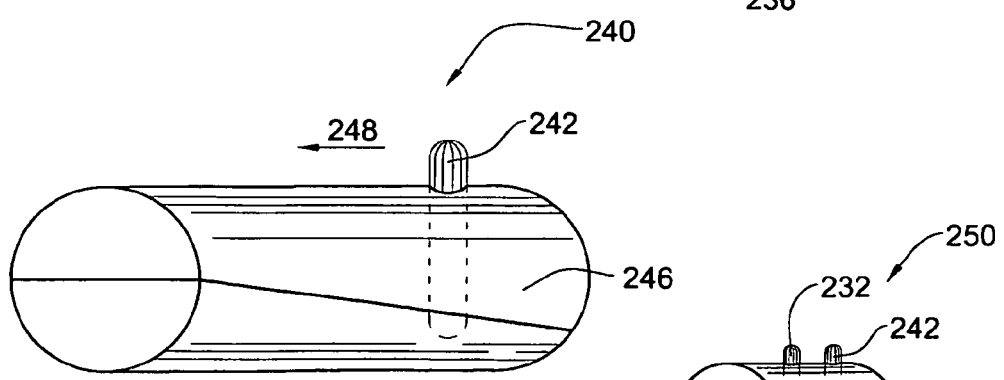
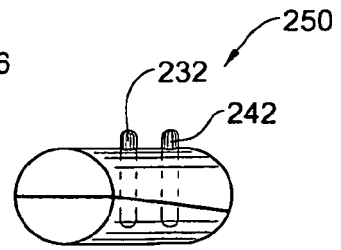
FIG. 17C

COUPLING PIN AND METHOD OF USE THEREOF

FIELD OF THE INVENTION

This invention relates to coupling pins and more specifically it is concerned with pins, and methods of use thereof, with more than one operational mode suited for fastening together two or more objects, for example, building construction machinery, with high shear and bending resistance.

BACKGROUND OF THE INVENTION

Coupling pins which are designed to couple two or more elements and bear shear loads caused by the coupling thereof, comprise a body portion (typically, though not restricted to, cylindrical) and often means for securing the pin at its assembled position, to thereby prevent its unintentional displacement. Such means can be, for example, retention pins (cotter keys) extending through the pin's body adjacent receptive ends thereof, snap rings, screw coupled nuts, etc.

Pins, of a type which is to be discussed in this specification, may comprise a body portion having a substantially polygonal or cylindrical shape. The cross-section of the body portion is dimensioned to fit to the aperture within which the pin is intended to be inserted. For example such cross-section may be circular, in which case the regular-shaped body will be cylindrical. Thus this specification is concerned with, inter alia, pins having a polygonal or cylindrical body portion, having a nominal diameter, a base portion, having a first diameter greater then said nominal diameter, and a tapered head, ending in a second diameter smaller than the nominal diameter.

It is appreciated that pins of having a design similar to that described above but having an appropriate size may be used to fasten both small items, such as the components of an office stapler, or much larger items, such as building construction machinery, if the pin's material type and construction are adapted to withstand the expected respective forces to which the pin will be subjected.

An example of building construction machinery that uses pins to fasten objects together is a tower crane. In order to withstand large shear stresses, such as those caused by heavy machinery, pins used therefor are generally made of single solid steel element free of voids which may reduce the pins shear stress/load bearing capacity. However, it should be noted that the material from which pins are made is a routine design choice, dependent on cost and the load bearing requirements of the pin.

U.S. Pat. No. 5,000,610 discloses a stop pin which has a forward end and a latching end is employed between spaced plates or walls having aligned apertures. The latching end of the stop pin has locking buttons formed on longitudinal faces of the stop pin and a shoulder spaced from the locking buttons by the thickness of the first plate. The forward end of the stop pin is inserted through the first aperture and into the second aperture. Additional axial force on the stop pin forces the lock button through the first aperture by rotating the latching end into relieved portions of the first aperture while the forward end of the stop pin opposes rotation. After the stop buttons pass through the first plate the pin straightens and is latched with the stop button and the shoulder on opposite sides of the first plates/U.S. Pat. No. 3,511,388 discloses another type of locking mechanism in which a pin has cotter keys inserted into both the base portion and the tapered head portion thereof. The inserted cotter keys serve to increase the diameter of the portion of the pin to which they are attached thereby halting the pin's motion into the aperture within which it is inserted.

GB Patent Serial No. 1,093,679 discloses (see FIG. 1) a tower crane comprised of, inter alia, mast sections 1 (which when assembled form a mast or tower), a base, a jib (working arm—a horizontal section at the top of the tower that is used to hoist the load), a machinery arm (a weight bearing horizontal section used to counterbalance the jib), a slewing unit (gears and a motor), and an operator cab (not shown) in which the operator sits. Tower cranes are designed to be assembled at differing heights for construction of buildings of differing heights and disassembled for transportation. The height of the tower crane is adjusted by adding a chosen number of mast sections onto the mast. The height of the tower crane also directly increases the forces to which the pins or connecting elements of the mast sections are subjected.

European Patent Specification No. 0720961 gives example figures of the types of weights that connecting members for mast sections of a tower crane are designed to withstand. Tremendous shear stresses on the connecting component can be caused by, for example, the "over 2268 kg" weight, that may be one of the elements being fastened. It should be noted that additional tower crane components may be further stacked on top the mast sections being fastened.

In view of the large magnitude of the above-mentioned example shear stress for mast sections of a tower crane, it can be appreciated that pins used to join two or more construction machinery components, such as those found in tower cranes, overhead cranes, bridge cranes, aircraft and other engineering equipment, can be exceedingly difficult to remove from the components which they couple.

Difficulty of insertion and removal of a pin from an aperture, however, may additionally or alternatively be dependent on the tolerance of the aperture within which the pin is fitted. A tight fit may be required for design purposes. In such case even a pin used to couple two or more components of a relatively small object, not subjected to large loads, such as an office stapler, may be difficult to insert or remove from an aperture to which it is tightly fitted. Alternatively, an aperture which would not have been a tight fit for a pin of a designated cross-section may become so, due to deformation due to loads thereon, corrosion, repeated removal and insertion of pins, etc., thereby causing the aperture to have an expanded or asymmetric shape. Such deformation of the shape of an aperture is known to be corrected by rewelding the aperture, at least for industrial components of the type adapted to withstand high shear forces.

SUMMARY OF THE INVENTION

According to the present invention there is provided a pin comprising a carriage member and a riding member, both of which being inclined longitudinally, shiftable between an assembled, load-bearing position and an axially shifted, insertion/retraction position.

The invention thus calls for a coupling pin comprising a carriage member and a riding member longitudinally slidable over the carriage member, said carriage member and riding member being mutually inclined longitudinally, and together complimenting each other to form a uniform pin.

Both the carriage member and the riding member may be made of any suitable material, e.g. steel or plastic, dependent upon the anticipated shear forces and intended use for the pin.

A coating may be applied over portions of the carriage member and riding member, e.g. over the mating planar surfaces, so as to reduce friction therebetween, etc.

The carriage member and the riding member may form together a leading head portion, a load-bearing body portion and a rear brace portion. The load-bearing body portion may be adapted to withstand high shear forces.

The arrangement is such that the load-bearing body portion, at the assembled load-bearing position, defines a nominal cross-sectional dimension of the coupling pin, which is dimensioned to fit the cross-sectional dimension of an aperture within which the pin is intended to be inserted. At the axially shifted position, namely the, insertion/retraction position, the cross-sectional dimension of each portion of the pin intended to be inserted through the aperture is smaller than the cross-sectional dimension of the aperture. Thus, the pin may be substantially easily inserted and removed from an aperture when in it's axially shifted position, despite being dimensioned to fit such aperture. After insertion of the pin into the aperture in it's axially shifted position, such that the load-bearing body portion of the carriage member is inserted in the aperture, the pin can be brought to it's load bearing position by sliding the riding member along the inclined planar surface of the carriage member such that the riding member becomes inserted or, if partially inserted in the axially shifted position, further displaced into the aperture. Due to the inclination of the planar surfaces of the carriage and riding members, the above-described motion of the riding member effectively enlarges or expands the cross-sectional dimension of the load-bearing body portion of the pin within the aperture, and will be referred to hereinafter as an "expansion effect".

Thus the load-bearing portion has a cross-sectional dimension at the load-bearing position of greater magnitude than the cross-sectional dimension of the body portion at an axially shifted insertion/retraction position A coupling pin in accordance with the present invention may comprise a carriage member and a riding member, may both of which being inclined longitudinally about a non-concentric axis over flush mating surfaces, and the riding member be slidingly displaceable over the carriage member between an assembled, load-bearing position, and an axially shifted, insertion/retraction position.

A coupling pin in accordance with the present invention, for coupling two components having concentric apertures may comprise, a carriage member and a riding member longitudinally slidable over the carriage member, both members being mutually inclined longitudinally and having a load bearing body portion. The pin may be adapted to be displaceable between an insertion/retraction position and a load bearing position. The insertion/retraction position may include the carriage member and the riding member being axially shifted and a combined cross-sectional dimension of the load bearing body portions at each longitudinal plane along the pin is of a magnitude smaller than the minimum diameter of the concentric apertures. The load-bearing position may include the carriage member and the riding member substantially overlapping one another and the combined cross-sectional dimension of the load bearing body portions at each longitudinal plane along the pin being of a magnitude equal or greater than minimum diameter of the concentric apertures.

It has been found that by inserting a pin into an aperture using the expansion effect allows ease of insertion and removal of a pin even under rough conditions e.g. large loads and shear forces, dirt, rust, bent, tightly sized aperture over the nominal body portion, etc.

Since the pin may be useful in applications which require tight-fit insertion and retraction thereof in an aperture, the pin may also be formed with an extended carriage member allowing it to couple to an element at a distal end thereof only. In such case the pin may be used as an axle or drive shaft of a vehicle. Where the carriage member is an extended carriage member, the pin may comprise a riding member at each end thereof.

Optionally, the exterior of the pin may have one or more planar-sections, thus reducing the nominal radial dimension of the assembled pin, for ease of insertion/removal of the pin from an aperture by reducing the contact area and hence the frictional forces therebetween. The one or more planar sections may be disposed at the exterior portions of the pin adjacent to the intersection between the carriage member and rider member. The intersection may be in the form of an axial edge formed between the two members.

The angle of the pin's carriage member and riding member incline may be within a range that allows ease of insertion into objects that are to be fastened, as will be elaborated hereinafter.

The sliding motion may be directed by at least a first guide member on the carriage member or riding member. The at least first guide being may be adapted for securing the riding member to the carriage member and/or halting the motion of the riding member with respect to the carriage member. The at least first guide member may be shaped like a ring or it may be shaped as part of a ring and may also function as the rear brace portion.

The dynamic nature of the riding member may further encourage the addition of a locking mechanism for securing the carriage member and riding member together. The locking mechanism may secure the pin in a plurality of modes and/or may function to halt motion of the riding member with respect to the carriage member and/or facilitate the motion of the riding member with respect to the carriage member. The locking mechanism may be in the form of a key member and may comprise at least one bolt for securing the carriage member and riding member together. The at least one bolt may secure the carriage member and riding member by insertion into a bore or slot formed within the riding member and subsequently a bore formed within the carriage member. The bore or slot in the carriage and riding members may be coaxially radially or axially formed therewith. The at least one bolt may comprise an engagement arrangement. The engagement arrangement may be in the form of external thread on the bolt and the carriage member may be formed with a corresponding internal thread to facilitate secure engagement of the two elements. In such case the threading may also be used to cause sliding motion of the riding member with respect to the carriage member. Alternatively or additionally, a locking mechanism may be externally mounted to the pin. In such case the carriage member and/or riding member may comprise a corresponding an external engagement arrangement for the locking mechanism to be mounted to. For example an external locking mechanism may be in the form of at least one ring having internal threading and the external engagement arrangement may be external threading on a portion of the pin to which the rings are to be mounted. The locking mechanism may also be pivotally mounted to the carriage member or the riding member.

The locking mechanism thus provides a way to lock the pin in different operative "modes" or "positions". For example, the pin may have a mode within which the riding member is substantially in overlapping alignment with the carriage member, namely a load-bearing position or "closed" mode and/or a mode where the riding member protrudes backward of the carriage member, namely an insertion/retraction position or "open" mode, where the cross-sectional dimension of the load-bearing body portion is significantly smaller then at the lead-bearing position.

For the purposes of the present specification and claims, if the locking mechanism is locked, i.e. stopping the motion of the riding member with respect to the carriage member, the pin is considered to be in "locked" mode. If the locking mechanism is unlocked and the riding member may move with respect to the carriage member the pin is considered to be in "unlocked" mode. Therefore there are four possible modes for the pin:

locked-closed mode, where the carriage member and riding member are aligned (in substantial overlap) and immobile with respect to each other;

unlocked-closed mode, where the carriage member and riding member are aligned (in substantial overlap) and mobile with respect to each other;

locked-open mode, where the carriage member and riding member are not aligned (i.e. the riding member axially projects from one end of the carriage member) and immobile with respect to each other; and unlocked-open mode, where the carriage member and riding member are not aligned and mobile with respect to each other.

It should be appreciated that when an axial force is applied to the riding member in an unlocked mode it may result in movement of the riding member only. However, if such a force is applied to the riding member in the locked mode it is likely to result in movement of the entire pin. The axial force may be the result of the application of a pushing, pulling or a rotational motion action. The axial motion may be adapted to be caused by any known tool suitable for such purpose, for example a wrench, screw, pneumatic/hydraulic/regular hammer. The pin may adapted so that the tool may be mounted thereon. The tool may also serve a dual use as a locking mechanism. For example, in a case where the locking mechanism is a bolt, the bolt may serve a dual use as a tool to cause the shifting motion. In such case the tool may be adapted to fit within a keyway formed with the riding member.

The pin may be designed such that the riding member is formed such that it protrudes past the carriage member in the substantially aligned mode and that the body portion of the pin may be substantially cylindrical when in the closed mode. However, the body portion may be formed with a polygonal-shaped cross section. The polygonal-shaped cross section may be a square, hexagonal etc., to match the shape of the aperture within which the pin is intended to be inserted. Such cylindrical or polygonal-shaped cross section may prevent pivotal displacement of the pin in the aperture with respect to a longitudinal axis thereof.

Additionally, in applications where high shear forces are expected to be applied to the pin, the load-bearing portion may be adapted to withstand high shear forces by constructing the carriage member and the riding member such that they are free of voids when in closed mode. That is to say that the pin will have an essentially solid cross section, preferably made of steel or another suitably hard material.

According to one particular arrangement, the carriage member and the riding member are formed with a dovetail arrangement for restricting displacement therebetween in an axial direction only.

It should be noted that pins in accordance with the present invention, may be useful in applications where they are subjected to high shear forces and/or tight tolerances. Notably such applications include heavy machinery and even small objects, as mentioned above.

In accordance with a further aspect of the present invention, a pin having any of the features described above may be part of a coupling assembly including an expansion sleeve to expand into an aperture having a different cross-sectional shape to that of the pin or which has a cross-sectional dimension slightly greater than that of the pin. The sleeve may have an axial slot running the entire length thereof, and may, for example have a C-shaped cross section if the sleeve is substantially cylindrical. In applications where high shear forces are anticipated, the sleeves may be made of a hard but flexible material. Such material may be steel. Additionally, the sleeve together with the pin inserted therein may form a solid unit, substantially free of voids, at least along a load-bearing portion thereof.

In accordance with yet another aspect of the present invention, there is provided a method of insertion of a pin, having any of the features described above, into an aperture to which it is dimensioned to fit thereto.

The method may include the following steps:

a) providing a pin comprising a carriage member and a riding member longitudinally slidable over the carriage member, said carriage member and riding member being mutually inclined longitudinally, and together complimenting each other to form a uniform pin having a load bearing body portion with a nominal cross-sectional dimension dimensioned to fit the cross-sectional dimension of the aperture; the load bearing body portion being constituted by both a portion of the carriage member and a portion of the riding member; the pin being displaceable between a load-bearing position whereby the carriage member and the riding member substantially overlap one another, and an insertion/retraction position wherein the carriage member and the riding member are axially-shifted and any overlapping portions of the carriage member and the riding member which constitute the body portion together have a cross-sectional dimension smaller than that of the nominal cross-sectional dimension;

b) inserting the pin in the insertion/retraction position into the aperture, such that the carriage member is disposed therein; and c) applying a force to the riding member such that it moves longitudinally with respect to the carriage member, into said load-bearing position such that said body portion with said nominal cross-sectional dimension is formed within the aperture.

The method may further include a step of fastening the pin in said load-bearing position, thereby fastening the pin within said aperture.

BRIEF DESCRIPTION OF THE DRAWINGS

In order to understand the invention and to see how it may be carried out in practice, some embodiments will now be described, by way of non-limiting examples only, with reference to the accompanying drawings, in which:

FIG. 5 is a longitudinal view of the riding member of the pin in FIG. 1;

FIG. 6 is a longitudinal view of the pin in FIG. 1, in locked-open mode;

FIG. 16 is a longitudinal view of another example of a pin, in closed mode, according to the present invention;

FIG. 17A is a longitudinal view of yet another example of a pin, in locked-closed mode, according to the present invention;

FIG. 17B is a longitudinal view of a further example of a pin, in locked-closed mode, according to the present invention;

FIG. 17C is a longitudinal view of another example of a pin, in locked-closed mode, according to the present invention;

DETAILED DESCRIPTION OF EXEMPLARY EMBODIMENTS

Figure 1:
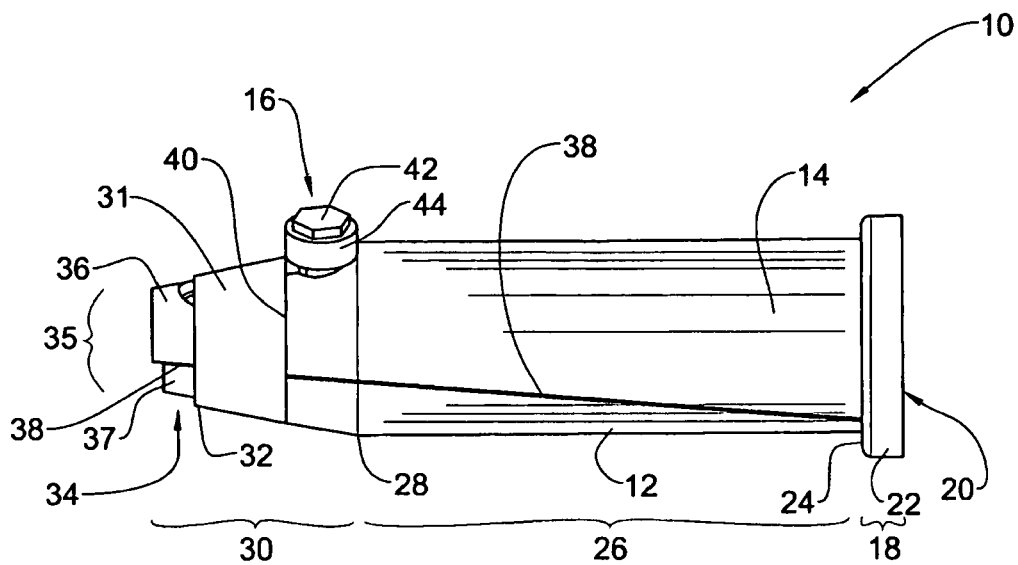
FIG. 1 is a longitudinal view of a pin, in locked-closed mode, according to the present invention.

Attention is first directed to FIG. 1 of the drawings, in which there is illustrated a pin, in accordance with the present invention, generally designated 10. The pin 10 comprises a carriage member 12, a riding member 14 which is insertable within the carriage member 12, and a locking mechanism 16 for immobilization of the riding member 14 with respect to the carriage member 12 and the pin 10 itself with respect to the objects within which it is inserted.

The pin 10 is adapted to fasten, for example, two mast-sections of a tower crane (not shown) or any other mechanical components. In order to support heavy loads such as mast-sections, the pin 10, in this case, is made of solid steel and is of sufficient size and construction to essentially resist permanent deformation when subjected to large shear stresses, as will be described hereinafter.

The pin 10 shown in it's locked-closed mode (i.e. an operative, load-bearing position) in FIG. 1, and may be described as comprising (excluding the locking mechanism 16 which will be described hereinafter) a base portion 18, a tapered head portion 30 and a cylindrically shaped body portion 26 (referred to as 'load-bearing body portion' and having a diameter referred to as the 'nominal diameter') disposed between the base portion 18 and the tapered head portion 30. The base portion 18 comprises a substantially planar bottom surface 20 and an annular ring 22 having a first outer diameter, the annular ring 22 further having an upper edge 24.

The body portion 26 which is essentially free of voids has a second outer diameter, corresponding with the nominal diameter of the pin. The body portion 26 constitutes the portion of the pin 10 between the annular ring's 22 upper edge 24 and a first edge indicated by the numeral 28. The first edge 28 also constitutes the start of the tapered portion 30, in which the pin 10 begins to taper to a reduced diameter. The tapered portion 30 further comprises a half-ring 31 and a top portion 34. The portion of the half-ring 31 visible in FIG. 1 is bordered by a first radial edge 40, a second radial edge 32 and the periphery of the carriage member 12. The second radial edge 32 has a third outer diameter and borders the top portion 34. The top portion 34 comprises an essentially flat top edge 35 which, like other elements of the pin 10 described-above, is constituted by both the carriage member 12 and the riding member 14.

It should be noted, however, that in the example shown there is a first frontal protrusion 36 of the half of the top edge 35 constituted by the riding member 14, which protrudes past the second frontal protrusion 37 of the half of the top edge 25 constituted by the carriage member 12. The reason for the first frontal protrusion 36 and the second frontal protrusion 37 will be explained hereinafter.

While it has been noted that the body portion 26 is essentially free of voids, there are a number of edges visible that show where the carriage member 12 and the riding member 14 are in contact. The aforementioned edges are: an inclined axial edge 38 disposed in the center of the pin 10, which extends through the pin 10 longitudinally from the center of the top portion 34 until the base portion 18; and radial edge 40, disposed in the tapered portion 30, extending from the periphery of the pin 10 until an intersection point with axial edge 38. It should be noted that axial edge 38 is obstructed in the current view by the annular ring 22 and the half-ring 31, as they are both integrally formed with the carriage member 12 within which the riding member 14 is disposed. It should also be noted that while the axial edge 38 starts from the approximate center of the top portion 34 it extends to a non-central part of the base portion 18, due to the inclination thereof, as shown in FIG. 1.

Figure 2:
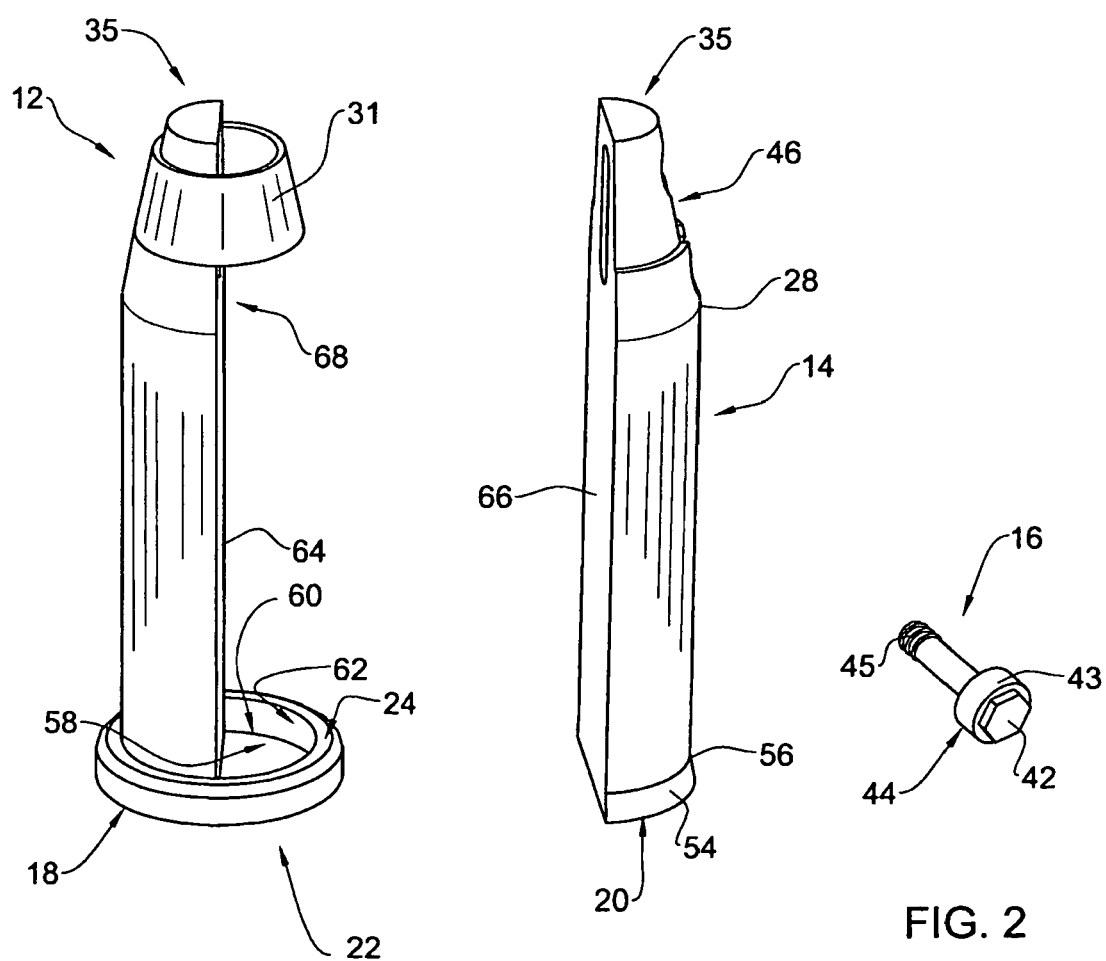
FIG. 2 is an exploded view of the pin in FIG. 1 with the pin elements (i.e. the carriage member and the riding member, excluding the locking mechanism) in the same orientation as shown in FIG. 1.

Referring now to FIG. 2, the locking mechanism 16, in this example, comprises a threaded bolt 42 and a threaded circular washer 44. The threaded bolt comprises a partially threaded shaft 45 and the circular washer 44 comprises a circular perimeter 43. The locking mechanism 16 is adapted to fasten the pin 10 in different modes.

Reverting to FIG. 1, the pin 10 in the current figure is shown in the locked-closed mode: the word "locked" signifies that the threaded bolt 42 is fastened tightly to the periphery of the riding member 14; and the word "closed" signifies the mode wherein the body portion 26 of the pin 10 is assembled such that along the cross section thereof has a nominal cross-sectional dimension corresponding to an anticipated cross-sectional dimension of an aperture within which the pin is designed to be inserted.

It should be appreciated that the threaded bolt 42 in the locked-closed mode of the pin 10 protrudes from the pin 10 in an outwards axial direction further than the second outer diameter of the body portion 26, for reasons which will be described hereinafter.

It should be further noted that the first outer diameter of the ring 22 is greater than the second outer diameter of the body portion 26, both of which are greater in diameter than the third outer diameter of the tapered portion 30.

Figure 3:
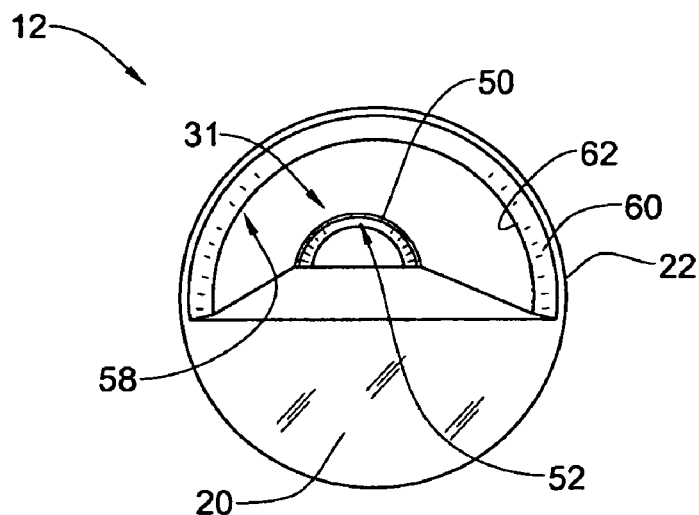
FIG. 3 is a bottom view of the carriage member shown in FIG. 1.
Figure 8:
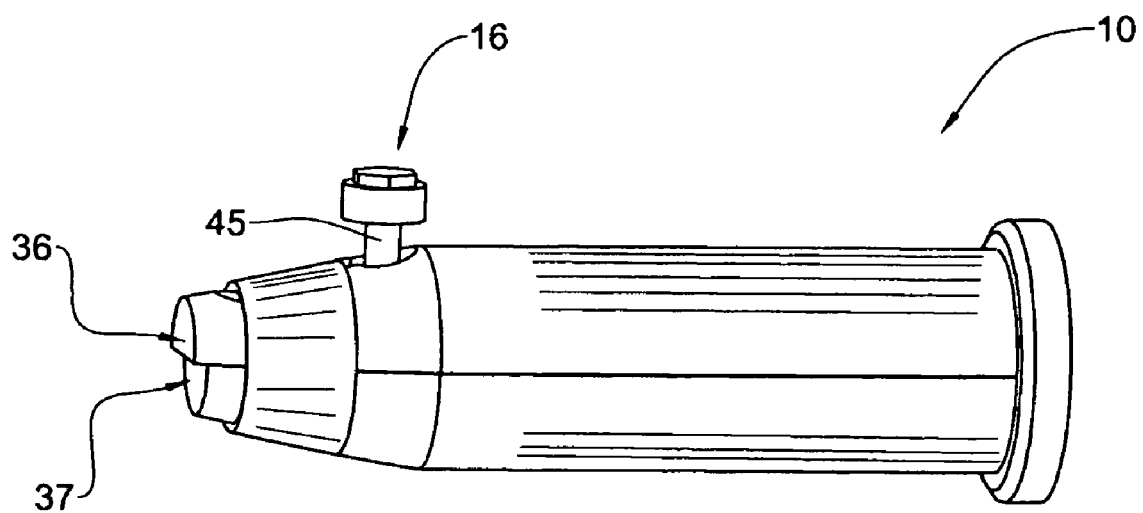
FIG. 8 is a longitudinal view of the pin in FIG. 1, in unlocked-closed mode.

Attention is now directed to FIGS. 2 and 3. From the first edge 28 to the top edge 35 the riding member 14 is shown to have a tapered periphery 46. It should be noted that on tapered periphery 46 there is a small depression 48 (seen more clearly in FIG. 4) which interrupts the linear tapering thereof. The depth of the depression 48 is of roughly the same magnitude as the thickness of the rim 50 belonging to half-ring 31. The benefit of the matching magnitude of the depression 48 and the rim 50 is such that when the pin 10 is assembled in a closed mode (as shown in FIGS. 1 and 8) the riding member 14 and the half-ring 31 are flush. Furthermore, the tapered portion 46 is only slightly smaller than the inner diameter 52 of the half-ring 31, allowing a close fit of the carriage member 12 and the riding member 14, when the pin 10 is in closed mode.

The periphery of the base portion 18, of the riding member 14, is shown to have a varied diameter constituting a radial projection. The varied diameter starts at the first peripheral edge 54 of the base portion 18, which is adjacent to the bottom surface 20, and tapers, reducing in diameter, until it reaches a second peripheral edge 56, adjacent to the body portion 26. It should be appreciated that the diameter of the first peripheral edge 54 is larger than the diameter of the second peripheral edge 56, for reasons that will be described hereinafter.

The annular ring 22 has an inner surface 58 with a varied diameter that corresponds to the varied diameter of the periphery of the base portion 18. The inner surface 58 has a first inner edge 60, disposed adjacent to the bottom surface 20, which tapers to a second inner edge 62. The second inner edge 62 is adjacent to the upper edge 24 of the annular ring 22 and hence also to the body portion 26. It should be noted that the first inner edge 60 and the second inner edge 62 have about the same diameter as the first peripheral edge 54 and the second peripheral edge 56, respectively, for reasons which will be discussed hereinafter.

Figure 4:
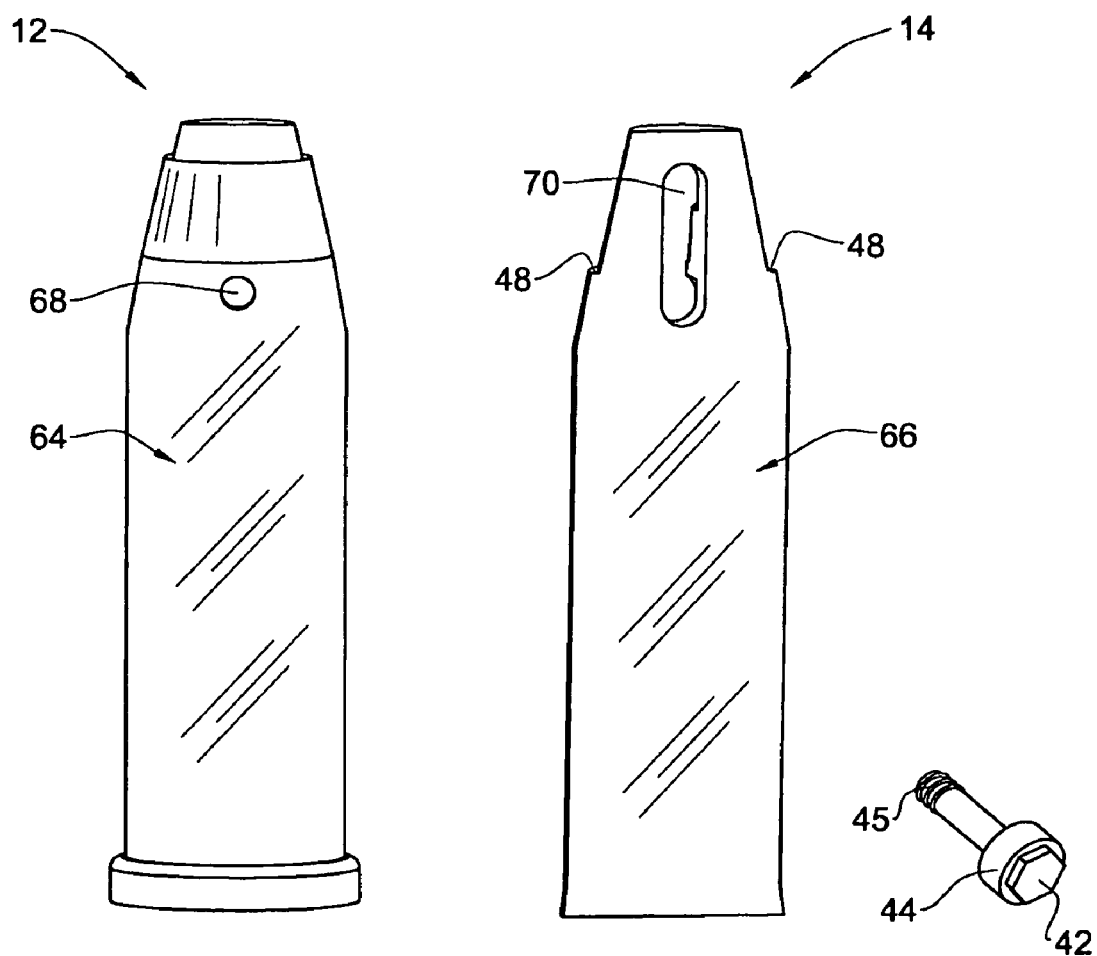
FIG. 4 is an exploded view of the pin in FIG. 1, further illustrating the inner surfaces of the pin components (excluding the locking mechanism)

Turning attention now to FIGS. 2 and 4, the following features can be seen: a first planar inner surface of the carriage member 12 and a second planar inner surface of the riding member 14, respectively numbered 64 and 66; a partially threaded shaft 45 belonging to the bolt 42; a bore 68, formed within the first inner surface 64 of the carriage member 12; an oval-shaped longitudinal slot 70, formed within the second inner surface 66 of the riding member 14. surfaces 64 and 66 are fitted for smooth sliding over one another and according to an embodiment of the application, these surfaces may be lubricated or coated with a friction-reducing substance.

Referring now to FIG. 5, the slot 70 can also be seen from an external view of the riding member 14. The slot 70 further comprises a semi-circular first end 72 and a semi-circular second end 74. Additionally, formed within the riding member 14 are a first circular depression 76, concentric with the first end 72 of the slot 70, and a second circular depression 78, concentric with the second end 74 of the slot 70. It should be noted that the diameters of the circular depressions (76 and 78) are the same magnitude and are larger than the circular perimeter 43 of the circular washer 44. In contrast the slot 70 has a perimeter with a width smaller than the circular perimeter 43 of the circular washer 44. Nonetheless the perimeter of the slot 70 is still wider than the diameter of the shaft 45, allowing it to be inserted with a loosefit.

Reverting to FIGS. 1 to 5, the locking mechanism 16 is capable of fastening the pin 10 in different operational modes. The fastening is accomplished by first inserting the riding member 14 into the carriage member 12 and then inserting the shaft 45 of the bolt 42 through the washer 44 and the slot 70 of the riding member 14 until it engages the bore 68. Once the shaft 45 enters a portion of the bore 68 it is rotated in a clockwise direction until the bolt 42 is secured tightly to the riding member 14. The so-called "locked" mode is achieved when the bolt 42 is secured tightly as described above, fastening the riding member 14 to the carriage member 12, and preventing motion thereof. It can be appreciated that in locked mode the washer 44 does not remain flush with the periphery of the riding member 14 but rather is partially sunk into one of the circular depressions (76 or 78), dependent on whether the pin 10 is in open or closed mode.

FIG. 6 illustrates a longitudinal view of pin 10 in locked-open mode. The term "open" with respect to the mode indicates that the riding member 14 is inserted into the carriage member 12 to the extent that the bore 68 (not shown) is concentric with the first circular depression 76 such that the bolt 42 can be inserted into both. Additionally, in "open" mode there is a significant longitudinal gap between the half-ring 31 and the first edge 28. The pin 10 is "locked" because the locking mechanism 16 has been inserted into the pin 10 and rotated as described above. It should be noted that the riding member 14 at the base portion 18 has a significant rear protrusion 79 from the annular ring 22 for insertion purposes to be described hereinafter. Additionally, the top of bolt 42 is flush or lower than the half-ring 31 so as not to impede insertion of the pin 10 into an aperture.

Figure 7:
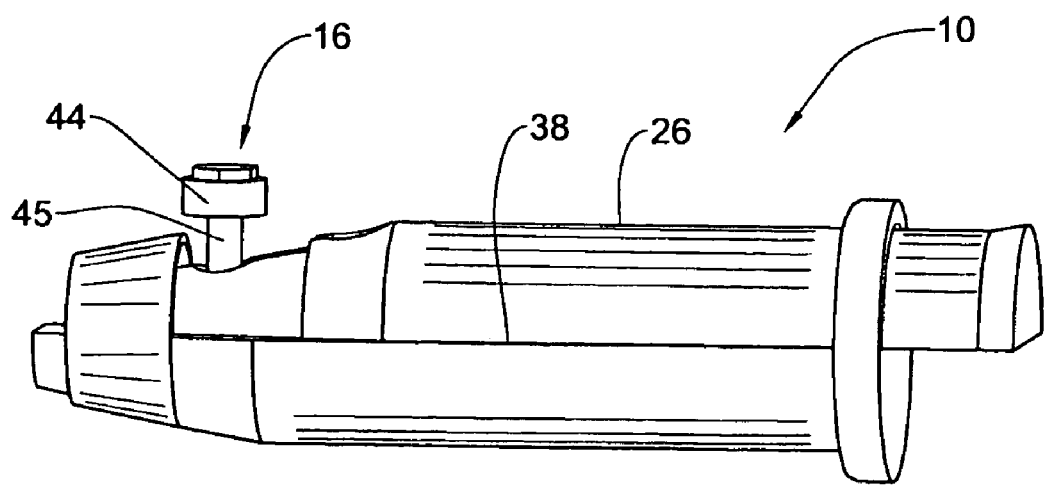
FIG. 7 is a longitudinal view of the pin in FIG. 1, in unlocked-open mode.

FIG. 7 illustrates a longitudinal view of pin 10 in unlocked-open mode. The pin 10 is "unlocked" because the locking mechanism 16 has been loosened from the position shown in FIG. 7, by counter-clockwise rotation thereof, the resulting position of which allows the shaft 45 to be visible. It should be noted the shaft 45, in this mode, remains partially screwed into the bore 68, restricting the bolt 42 from non-rotational motion. The continued engagement of the bolt 42 to the bore 68 prevents the locking mechanism 16 from falling out of the pin 10, while allowing the riding member 14 to move within the boundaries dictated by the slot 70, i.e. in an axial direction. As the washer 44 is distanced further from the axial edge 38 than the periphery of the body portion 26, and because of the loosefit of the shaft 45 within the slot 70, the riding member 14 is capable of sliding between "open" and "closed" modes.

FIG. 8 shows the pin 10 in the same position as shown in FIG. 1, with the exception of the position of the locking mechanism 16 which is in "unlocked" position as shown in FIG. 7. When the pin 10 is changed from unlocked-open mode to unlocked-closed mode, the sliding motion of the riding member 14 is also restricted in motion by: the half-ring, restricting rotational movement; depression 48 in combination with the rim 50 of the half-ring 31, preventing the riding member 14 from penetrating too far into the carriage member 12 such that the second circular depression 78 would not be concentric with the slot 70; and the annular ring 22 which prevents rotation of the riding member 14 and due to the varied diameter of the inner edges 60 and 62 thereof also serves to prevent the riding member 14 from penetrating too far into the carriage member 12.

Referring now to FIGS. 9 to 12 In operation the pin 10 is used to fasten, in this example, the connecting flanges of two adjacent sections, e.g. mast sections. The mast sections 82 each comprising apertures 80 (FIG. 9) having diameters corresponding with (i.e. slightly greater) the nominal diameter of the pin 10.

Figure 9:
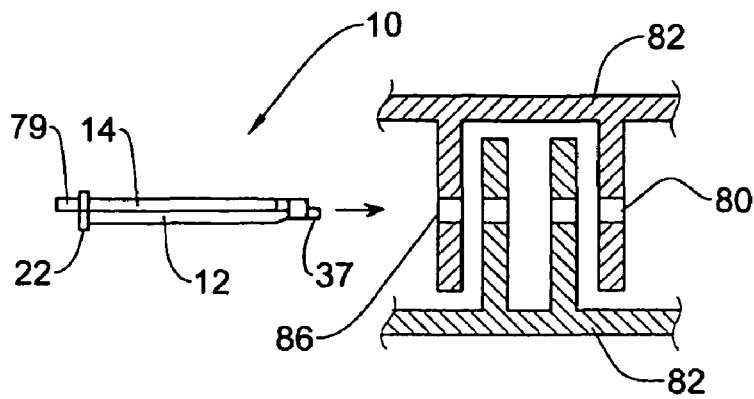
FIG. 9 is a view of the pin in FIG. 1, in locked-open mode before insertion into the connecting portions of two mast sections.
Figure 10:
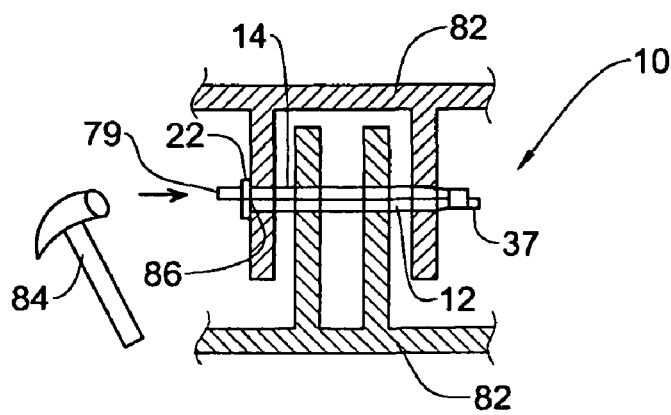
FIG. 10 is a view of the pin in FIG. 1, in an unlocked-open mode while inserted in the two mast sections shown in FIG. 9.

Before insertion of the pin 10 into the mast sections 82, the pin 10 is in locked-open mode (FIG. 9, this mode is also seen in FIG. 6). The pin 10 is then inserted, tapered portion 30 first, into apertures 80 belonging to the mast sections 82, as seen in FIG. 10. Once inserted, i.e. when the annular ring 22 engages the surrounding area of the first aperture 86, the pin 10 is switched to unlocked-open mode (FIG. 10). This change of mode may be accomplished by rotating the bolt 42 in a counter-clockwise direction with, for example, a wrench (not shown). In order to further insert the riding member 14 of the pin 10, into the mast sections 82, a hammer 84 (FIG. 10), or like tool, may be used to strike the rear protrusion 79 of the base portion 18. Subsequent blow(s) of the hammer 84, to the rear protrusion 79 of the base portion 18, cause the riding member 14 to slidingly penetrate further into the carriage member 12. The sliding motion stops when the restrictions mentioned above are reached.

Figure 11:
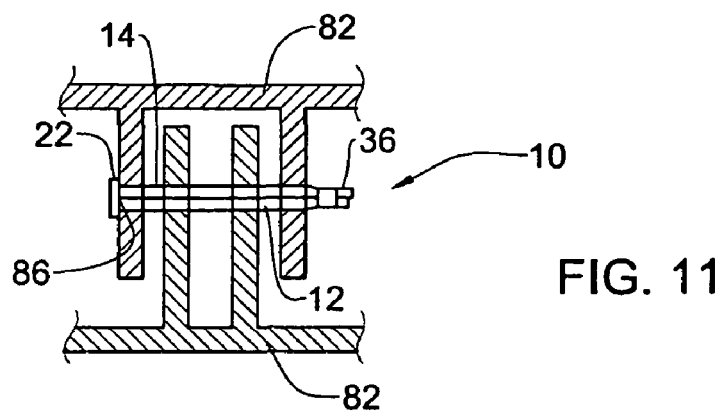
FIG. 11 is a view of the pin in FIG. 1, in an unlocked-closed mode while inserted in the two mast sections shown in FIG. 9.
Figure 12:
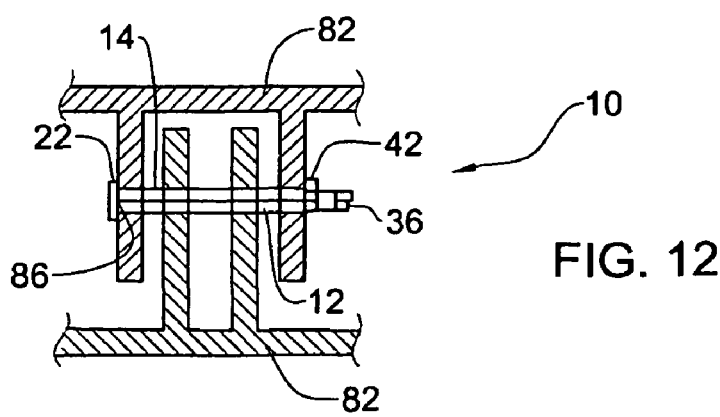
FIG. 12 is a view of the pin in FIG. 1, in locked-closed mode while inserted and fastening the two mast sections shown in FIG. 9.

When the sliding motion stops the pin 10 is effectively transformed into unlocked-closed mode (FIG. 11). The pin 10 is then switched to locked-closed mode (FIG. 12, also seen in FIG. 1). This change of mode may be accomplished by rotating the bolt 42 in a clockwise direction, for example, with a wrench (not shown). The position of the bolt 42, in the locked-closed mode of the pin 10, protruding from the pin in an outwards axial direction further than the second outer diameter of the body portion 26 allows it to engage the surrounding area of the final aperture 88, thereby preventing the pin from sliding through the apertures 80 in the reverse direction to which it was hammered providing a safety function.

To remove the pin 10 from the mast sections 82, the bolt 42 must be unfastened, returning the pin 10 to the unlocked-closed mode (FIG. 11). The hammer 84 may then used to strike the first frontal protrusion 36 causing the riding member to move in an axial direction, opposite to the direction of insertion of the pin 10, restoring the pin to the unlocked-open mode (FIG. 10). The bolt 42 is then rotated in a clockwise direction, for example, with a wrench (not shown) placing the pin 10 in locked-open mode (FIG. 10). Subsequent blow(s) of the hammer 84 to the second frontal protrusion 37 causes the pin 10 to be ejected from the mast sections 82 (FIG. 9).

It should be appreciated that considerably less force is needed to insert or remove a pin of the current invention into the above-described mast sections 82 as would be needed for a normal pin. A reason for this being that: the base portion of a normal pin generally has a cross sectional area of approximately the same magnitude as it's body portion; modern science teaches that pressure on an object is proportional to a force applied over an area of that object (i.e. Pressure α Force/Area); the area that is being struck by the hammer 84, i.e. the frontal or rear protrusion, constitutes about half the bottom surface 20 of the base portion 18, which is considerably smaller than the cross sectional area of the body portion 26; therefore a force of a certain magnitude when applied to the base of a normal pin and applied to a pin constructed according to the current invention, will provide a far greater pressure on a pin constructed according to the current invention.

It can be similarly noted that during removal of a pin 10 constructed according to the current invention, from objects it is fastened thereto, the reduced cross-sectional area of the first frontal protrusion 36, which is about half the cross-sectional area of the second radial edge 32, would be smaller than the cross-sectional area of the tip of a normal pin. The reduced area would therefore require a comparatively smaller amount of force to displace the pin 10.

During the insertion/deletion steps, described above, in which only the riding member 14 is displaced, the force applied to the pin 10 need only be sufficient to move a portion of the pin 10, i.e. the mass of the riding member 14 in addition to a small friction force, as compared to force needed to move a pin of normal construction.

Aside from the reduction in force needed for insertion/removal of a pin of the current invention a further benefit can be seen in the insertion/removal process. As the pins are of considerable mass and are often struck with tremendous force, often at high altitudes such as building construction cites, there is a significant danger of a falling pin becoming a lethal projectile. During insertion of the pin 10 into the mast sections 82, the annular ring 22, which has a diameter larger than that of the apertures 80 within which it is inserted, prevents the pin from passing through the objects to which it is being inserted. During removal, the staged removal process, combined with the need for less force allows the pin to be removed more gradually, thereby prevented from becoming a dangerous projectile like a regular pin.

Figure 13:
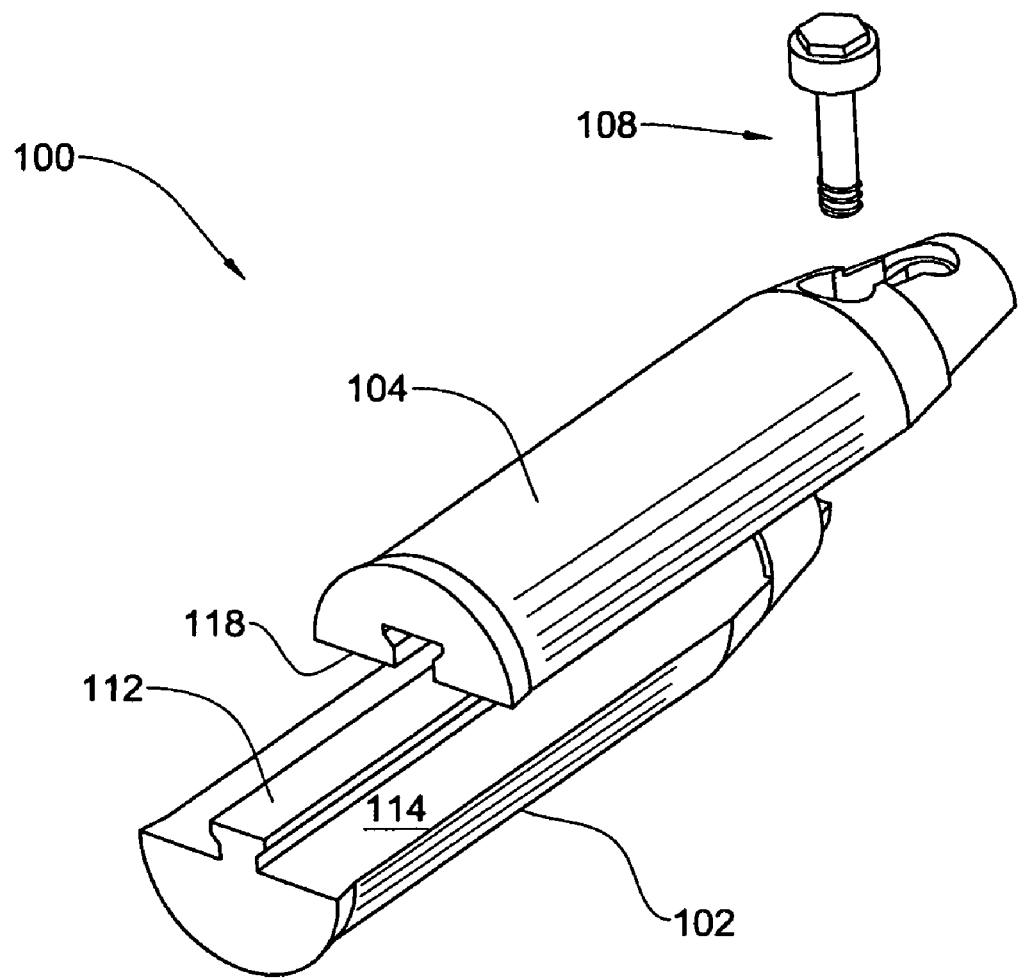
FIG. 13 is an exploded rear isometric view illustrating another embodiment of a coupling pin according to the present invention.

Referring now to FIG. 13 of the drawings there is illustrated a modification of the pin generally designated 100 and being substantially similar to the previous embodiment, namely comprising a carriage member 102, a riding member 104, a locking mechanism 108 (namely a threaded bolt and washer). However, rather then front and rear support rings 22 and 31 respectively, there is a dovetail arrangement comprising an axially extending mail portion 112 formed on the substantially flat surface 114 of the carriage member 102, and a corresponding female groove axially extending along the mating surface 118 of the riding member 104, to thereby limit displacement of the two members in axial direction only.

Figure 14:
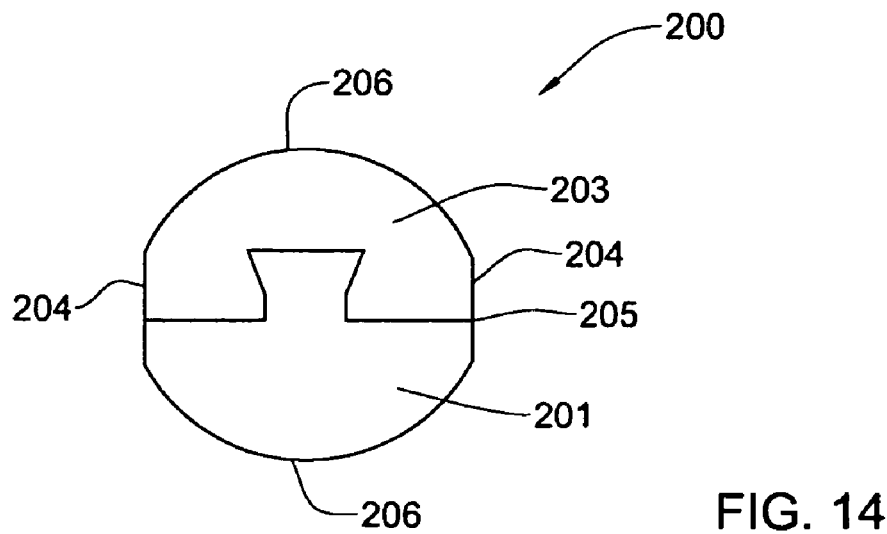
FIG. 14 is an axial view of yet another embodiment of a coupling pin according to the present invention.
Figure 15:
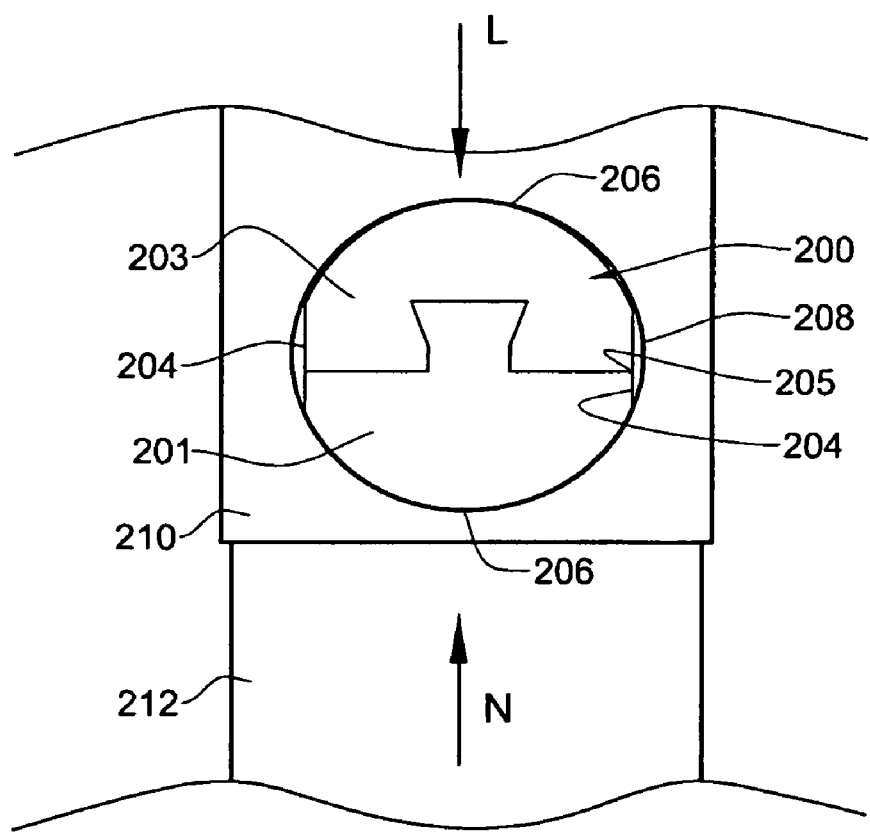
FIG. 15 is an axial view of the pin in FIG. 14, inserted into two mast-sections.

Turning attention to FIGS. 14 and 15, there is illustrated a further embodiment of a pin, generally designated 200, which is similar to the pin 100 shown in FIG. 11. However, the pin 200, when assembled, additionally comprises two planar-sections 204 and two curved-sections 206. Notably, the planar-sections 204 are disposed at the exterior portions of the pin adjacent to the intersection between the carriage member 201 and rider member 203, the intersection in this example being an axial edge 205.

In FIGS. 14 and 15 the nominal diameter of the pin 10 is reduced so as to facilitate its easy insertion into an aperture 208. Where two planner sections are provided, they may be parallel to one another. The reduction in the sectional area of the assembled pin is considered to be negligible so as not to effect the shear and bending resistance thereof.

It can be seen from FIG. 15 that when the pin 200 is inserted into apertures 208 formed within an upper mast-section 210 and a lower mast-section 212 disposed thereunder, the curved-sections 206 of the pin 200 are oriented to bear the load (generally indicated by the arrow L) caused by the weight of the upper mast 210, and resultant normal force thereto (generally indicated by the arrow N) caused by the lower mast-section 212. As the majority of forces on the pin 200 in the above-described arrangement are parallel with arrows L and N the pin 200 does not necessarily need to be cylindrical and therefore may have the above-identified planar-sections 204, allowing for ease of insertion/removal of the pin 200 from the apertures 208 by reducing the contact area therebetween and hence the frictional forces.

While the embodiments above have similar shaped portions to known pins, namely, a base portion, a tapered head portion and a cylindrically shaped body portion disposed between the base portion 18 and the tapered head portion 30, it should be understood that due to the expansion effect provided by the carriage member and riding member being mutually inclined longitudinally, the present invention is advantageous even when not comprising all of the above body portions.

Thus, in FIG. 16, there is shown a cylindrical coupling pin, generally designated as 220, having a concentric axis X and comprising a carriage member 222 and a riding member 224 longitudinally slidable over the carriage member 222, said carriage member 222 and riding member 224 being mutually inclined longitudinally, and together complimenting each other to form a uniform pin. Notably, the mutual incline of edge 226 is not coaxial with the concentric axis X. Such incline allows the pin to expand into and fill an aperture (not shown) in which it is being inserted. It should further be noted that the expansion effect alone significantly reduces the amount of force required to insert a pin into an aperture for joining two components under high shear forces or an aperture being of a tight fit. Thus, for example, for heavy machinery applications the pin 220 would be constructed of steel and would be substantially free of voids, thereby providing the providing the benefits of a single piece solid pin (not shown) and the additional advantage of easier insertion and removal capability. It should be understood that the angle of inclination of the pin may be varied in accordance with design requirements, and may not be as steep as the inclinations shown in the figures for the purpose of illustration.

While it has been noted that expansion of a pin in accordance with the present invention into an aperture may itself halt movement of the riding member, a locking mechanism, as described above may be used to ensure that such pin remains in the desired position. Such locking mechanisms or members for stopping motion may be of any of the types described above or may be of any suitable design for stopping the riding members motion.

For example, in FIG. 17A there is shown a pin 230 with a locking mechanism in the form of a cylindrical member 232 inserted in a bore (not shown) which extends through the riding member 234 and into the carriage member 236.

Alternatively, FIG. 17B shows a pin 240 with an inserted cylindrical member 242 placed at the thicker end of the riding member 246. One of the advantages of a locking mechanism being placed at the thicker end of the riding member 246 is that during insertion of the pin 240 into an aperture (not shown), in the direction of arrow 248, a user does not need to gain access to the leading end of the pin 240 and thus may secure the riding member and carriage member from the insertion end of the aperture.

It should be understood that, dependent upon the specific constructional features of a pin in accordance with the present invention, motion of the riding member may be caused by any appropriate motion such as a pushing force, pulling force, rotational force etc. Thus, for example, with respect to the pin 240 illustrated in FIG. 17B, after removing the cylindrical member 242 from the riding member 246, a portion of a tool could be inserted into the aperture (not shown) in the riding member 246, such that it does not extend to the carriage member, and the tool may be pulled to move the riding member 246 relative to the carriage member.

Referring to FIG. 17C as a further example, it should be understood that a pin 250 may include any desired number of locking mechanisms (232,242).

Figure 17D:
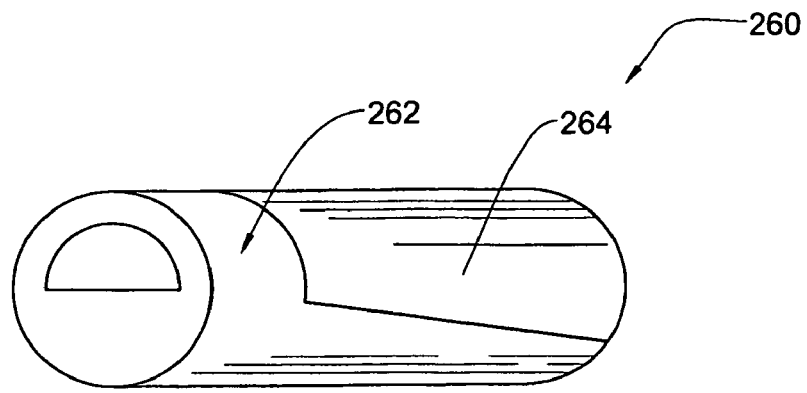
FIG. 17D is a longitudinal view of yet another example of a pin, in closed mode, according to the present invention.
Figure 17E:
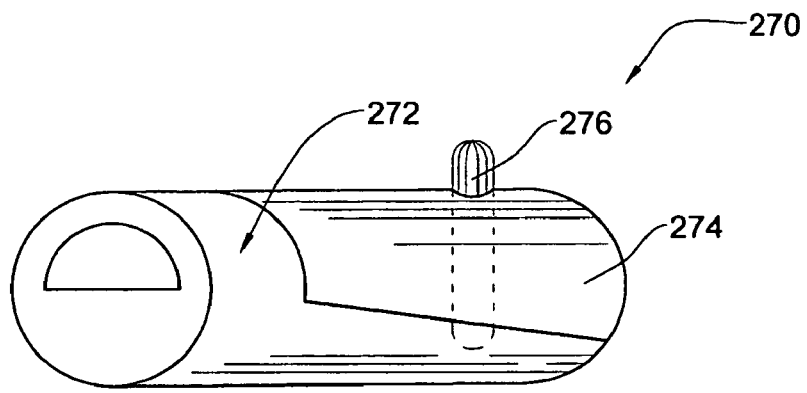
FIG. 17E is a longitudinal view of a further example of a pin, in locked-closed mode, according to the present invention.

Referring now to FIGS. 17D and 17E, it is shown that pins (260, 270) may comprise half-rings (262,272), which may be similar to those described above, for directing and halting the motion of the riding members (264, 274) and may additionally comprise locking mechanisms 276.

While the above examples showed radially disposed guide members and locking mechanisms, it should be understood that such guide members or locking mechanisms may be axially disposed.

Figure 17F:
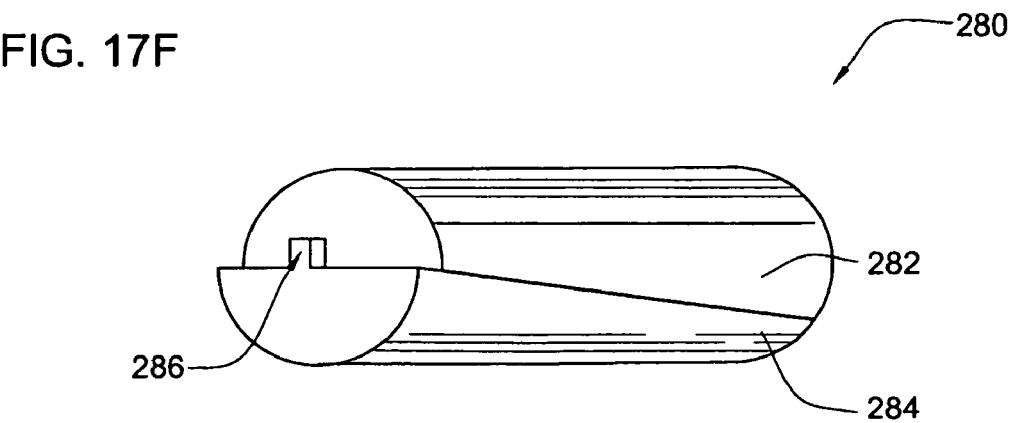
FIG. 17F is a longitudinal view of another example of a pin, in closed mode, according to the present invention.

In FIG. 17F there is illustrated a pin, generally designated as 280, comprising a riding member 282 and a carriage member 284. The carriage member 284 is formed with a tooth-shaped mechanical stopper 286 at one end thereof for halting motion of the riding member 282.

Figure 17G:
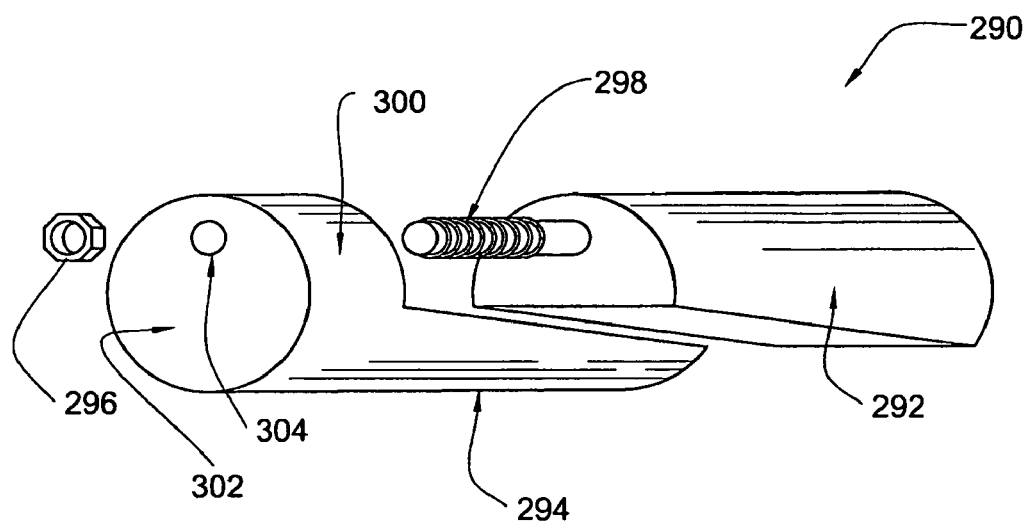
FIG. 17G is an exploded view of yet another example of a pin, according to the present invention.
Figure 17H:
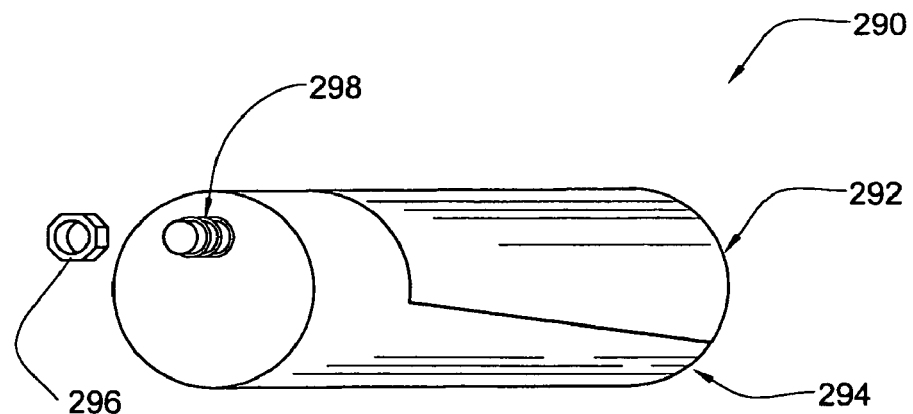
FIG. 17H is a partially exploded view of the pin in FIG. 17G, in closed mode.

Referring now to FIGS. 17G and 17H, there is illustrated components of a pin, generally designated as 290, comprising a riding member 292, a carriage member 294 and a nut 296. The riding member 292 is integrally formed with a cylindrically-shaped axially projecting threaded member 298. The carriage member 294 is formed with a half-ring 300 and a solid end face 302 having an aperture 304 formed therewith. During assembly, motion of the riding member 292 is halted by engagement thereof with the half-ring 300 and/or the solid end face 302. Once the pin 290 is in unlocked-closed mode (FIG. 17H), the threaded member 298 protrudes through the aperture 304 and the riding member 292 may be locked in position by fastening the nut 296 thereto.

Members for halting or locking motion of a riding member may also serve to facilitate motion of the riding member. Some examples of pins with such members are illustrated in FIGS. 18A-19E.

Figure 18A:
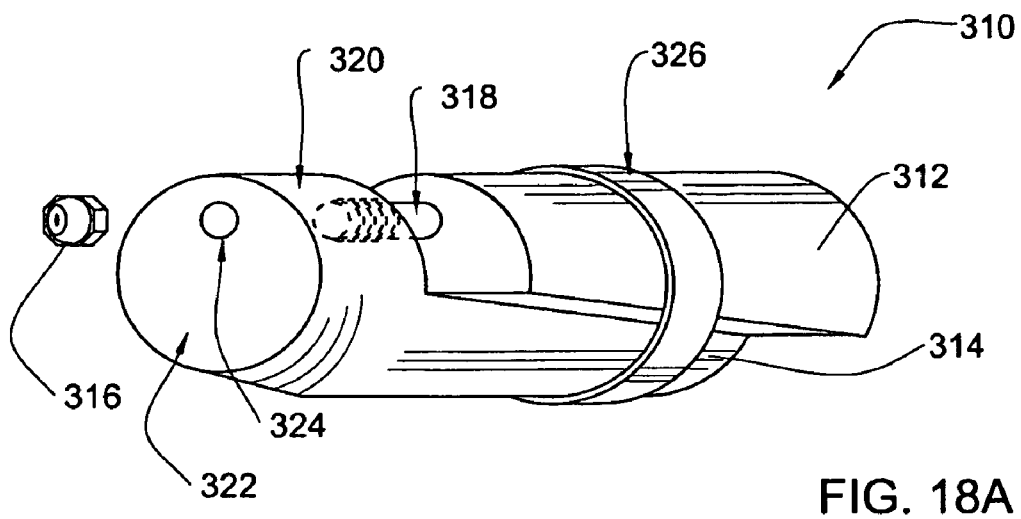
FIG. 18A is a partially exploded view of another example of a pin, in unlocked-open mode, according to the present invention.
Figure 18B:
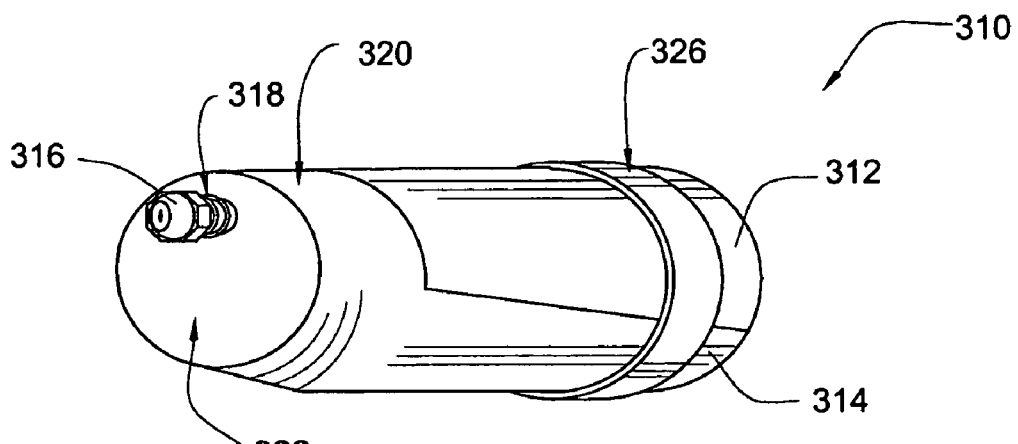
FIG. 18B is a longitudinal view of the pin in FIG. 18A, in unlocked-closed mode.
Figure 18C:
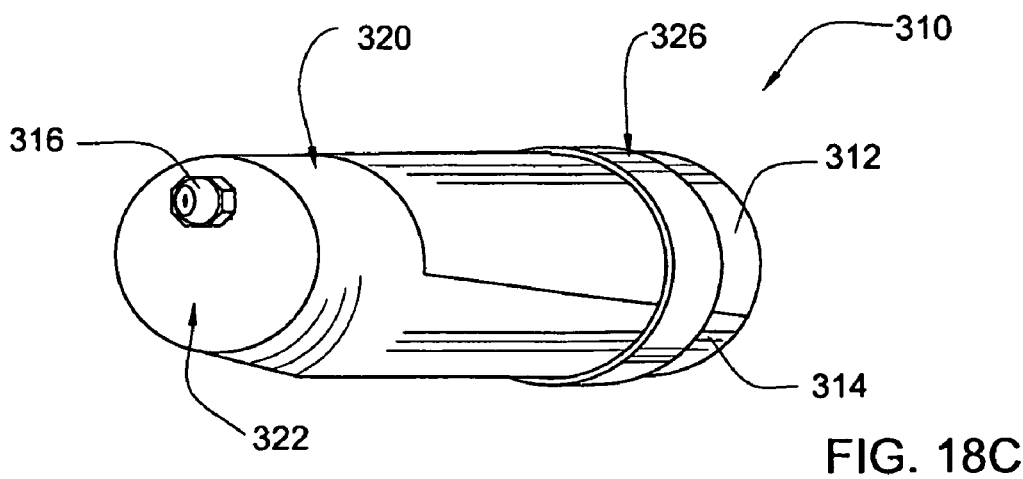
FIG. 18C is a longitudinal view of the pin in FIG. 18A, in locked-closed mode.

In FIGS. 18A-18C there is illustrated a pin, generally designated as 310, comprising a riding member 312, a carriage member 314 and an acorn-nut 316. The riding member 312 is integrally formed with a cylindrically-shaped axially projecting threaded member 318. The carriage member 314 is formed with a half-ring 320, a solid end face 322 having an aperture 324 formed therewith, and an annular ring 326.

Assembly of the pin 310 is substantially the same as that described above with respect to pin 290, with FIG. 18B illustrating the acorn-nut 316 partially fastened onto the threaded member 318 and FIG. 18C illustrating the acorn-nut 316 fully fastened and the pin 310 in locked-closed mode.

However removing the riding member after the pin 310 is in locked-closed mode (FIG. 18C) may involve partially unscrewing the acorn-nut 316 to bring the pin 310 into the position shown in FIG. 18B, and striking the acorn-nut 316 with a tool such as a hammer (not shown). While the movement of the riding member may be limited by the distance between the acorn-nut 316 and the solid end face 322 in FIG. 18B, this movement may be enough to reverse the expansion of the pin 310 in an aperture (not shown), i.e. to contract the cross-sectional dimension of the pin 310, to a degree where shear forces have been substantially or fully removed from the pin 310, allowing easy removal of the riding member 312 thereafter. Thus the acorn-nut 316 may provide a similar advantage to the first frontal protrusion 36 described above with respect to pin 10 in FIGS. 1-12. The use of an acorn-nut 316, which is a round-ended, may cause less damage to a hammer than striking a normal nut or the threaded member 318 itself.

It should be understood that the pin 310 may comprise any suitable features described in the specification. For example to further control the motion of the pin 310 and/or riding member, the pin's 310 riding member may further comprise a slot having a semi-circular first end and semi-circular second end, and a first circular depression, concentric with the first end of the slot, and a second circular depression, concentric with the second end of the slot, and the carriage member may further comprise a bore aligned with a portion of the slot, and the pin may further comprise a locking mechanism for insertion into the slot and bore, similar to those described above with respect to pin 10.

Figure 19A:
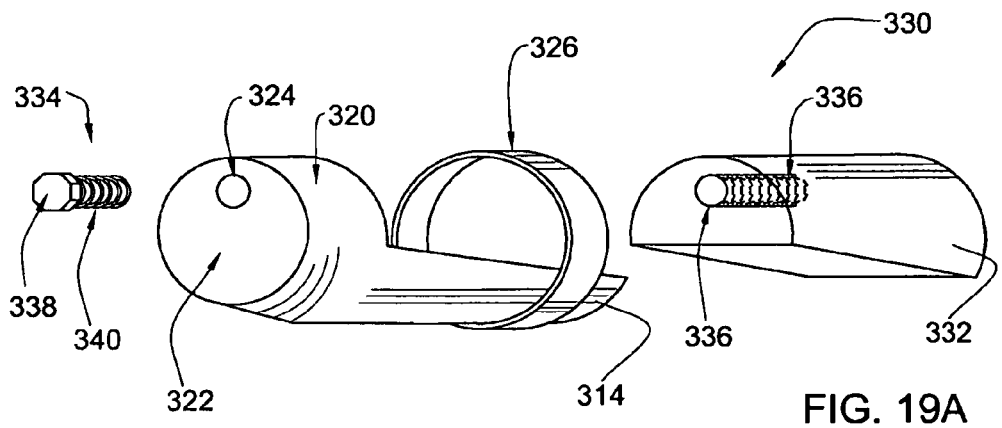
FIG. 19A is an exploded view of another example of a pin, according to the present invention.
Figure 19B:
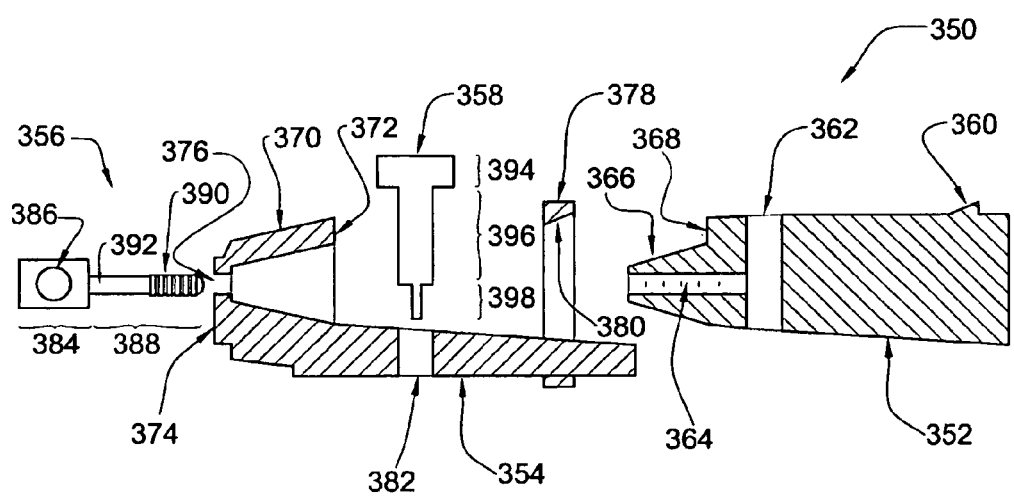
FIG. 19B is an exploded view of still a further example of a pin, with the riding member and carriage member thereof being sectioned, according to the present invention.

In FIG. 19A there is illustrated a pin, generally designated as 330, comprising a riding member 332, a carriage member 314 and a threaded bolt 334. The riding member 312 is formed bore 336 having threading corresponding to that of the threaded bolt 334. The carriage member 314 is identical to that described with respect to FIGS. 18A-18C. The threaded bolt 334 comprises a head portion 338 and an externally threaded shaft portion 340.

When the pin 330 is assembled, the threaded bolt 334 engages the bore 336 of the riding member 336 through the aperture 324 in the solid end face 322. Via the use of a tool such as a spanner (not shown), the head portion 338 of the threaded bolt 334 may be rotated causing the riding member 336 to achieve locked-closed mode or alternatively to propel the riding member away from the solid end face 322 via the threaded engagement of the shaft portion 340 and the bore 336.

In FIGS. 19A-19D there is illustrated a pin, generally designated as 350, comprising a riding member 352, a carriage member 354, a threaded bolt 356 and a dual-purpose tool member 358. The riding member 352 is formed with a peripheral edge of varied diameter 360, a radial bore 362, an internally threaded axial bore 364, and a tapered head portion 366 ending at a shoulder 368. The carriage member 354 is formed with a half-ring 370 having a rim 372, a solid end face 374 having an aperture 376 formed therewith, an annular ring 378 having a varied inner 380 diameter corresponding to that of peripheral edge 380, and a radial bore 382. The threaded bolt 356 comprises a cylindrical head portion 384 having a bore 386 formed therewith, and a shaft portion 388. The shaft portion 388 comprises a threaded section 390 and a non-threaded section 392. The tool member 358 comprises a cylindrical head portion 394 having a diameter greater than that of the radial bore 362, a cylindrical central portion 396 having a diameter corresponding to that of the radial bores (362, 382) respectively of the riding member 352 and the carriage member 354, and a cylindrical end portion 398 having a diameter corresponding to that of the bore 386 formed with the head portion 384 of the threaded bolt 356.

Figure 19C:
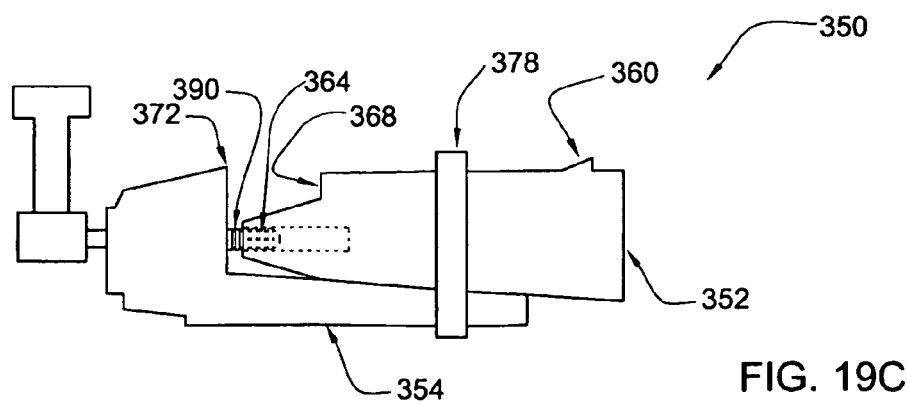
FIG. 19C is a longitudinal view of the pin in FIG. 19B, in unlocked-open mode.

In FIG. 19C it can be seen that assembly of the pin 350 is similar to that of the pin 330 in FIG. 19A. The shaft portion 388 of the threaded bolt 356 passes through aperture 376 of the solid end face 374 and the threaded section 390 engages the internally threaded axial bore 364 of the riding member 352. The end portion 398 of the tool member 358 is inserted in the bore 386 of the threaded bolt 356 and rotated causing the riding member 352 to achieve locked-closed mode or alternatively to propel the riding member away from the solid end face 374. The motion of the riding member 352 may also be halted by engagement of the peripheral edge 360 thereof with the peripheral edge 380 of the annular ring 378 and/or by engagement of the shoulder 368 thereof with the rim 372 of the half-ring 370.

Figure 19D:
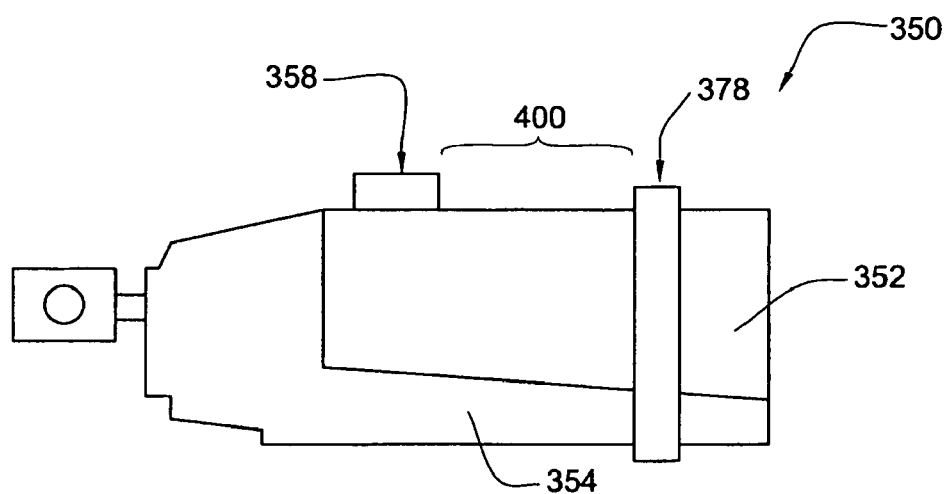
FIG. 19D is a longitudinal view of the pin in FIG. 19B, in locked-closed mode.

Turning attention to FIG. 19D, it can be seen that after the pin 350 is in locked-closed mode, the tool member 358 can be inserted into the radial bores (362, 382) of the riding member 352 and the carriage member 354 and thus stored for further use. Notably, once the tool member 358 is inserted, the load bearing portion of the pin 350, designated as 400, is bounded by the tool member's cylindrical head portion 394 and the annular ring 378. Thus the tool member 358 and annular ring 378 may be designed to have a radial dimension greater than the cross-sectional dimension of an aperture (not shown) within which the pin 350 is intended to be inserted. In such case these members will further serve to retain the position of the pin 350, when the load bearing portion 400 is disposed within the aperture.

It should be noted that members of a pin in accordance with the present invention may also be locked or propelled by externally disposed elements.

Figure 19E:
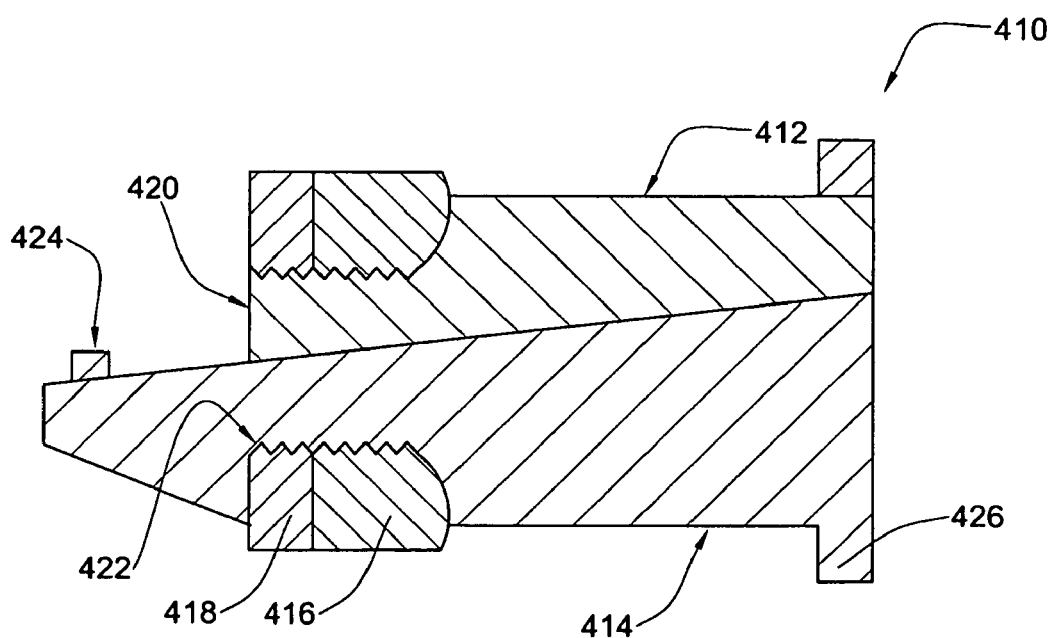
FIG. 19E is a sectional view of another example of a pin, in locked-closed mode, according to the present invention.

In FIG. 19E there is illustrated a pin, generally designated as 410, comprising a riding member 412, a carriage member 414, an internally threaded conical nut 416 and an internally threaded locking nut 418. The riding member 352 is formed with an externally threaded head portion 420 corresponding to the internal threading of the conical nut 416 and locking nut 418. The carriage member 414 is formed with an externally threaded head portion 422 corresponding to the internal threading of the conical nut 416 and locking nut 418, a tooth-shaped mechanical stopper 424 at one end thereof and an annular ring 426.

To facilitate motion of the riding member 412 relative to the carriage member 414, the locking nut 418 is removed and the conical nut 416 is rotated. When the pin 410 is in a desired position the locking nut 418 may be fastened thereon to bring the pin 410 to locked-closed mode.

Figure 20:
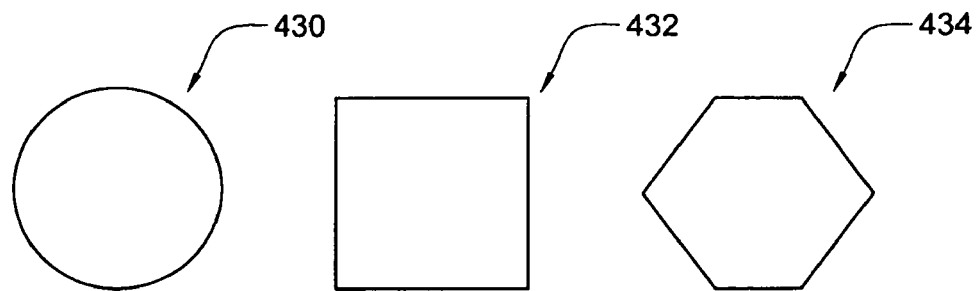
FIG. 20 is a schematic view of examples of regular-shaped apertures.

While the above examples have been described with reference to substantially cylindrically shaped pins, it should be understood that the cross-section of the pin may be designed to correspond to the shape of an aperture within which it is to be inserted. Example apertures such as those shown in FIG. 20 may be regularly shaped, e.g. circular 430, square 432 or hexagonal 434.

Figure 21:
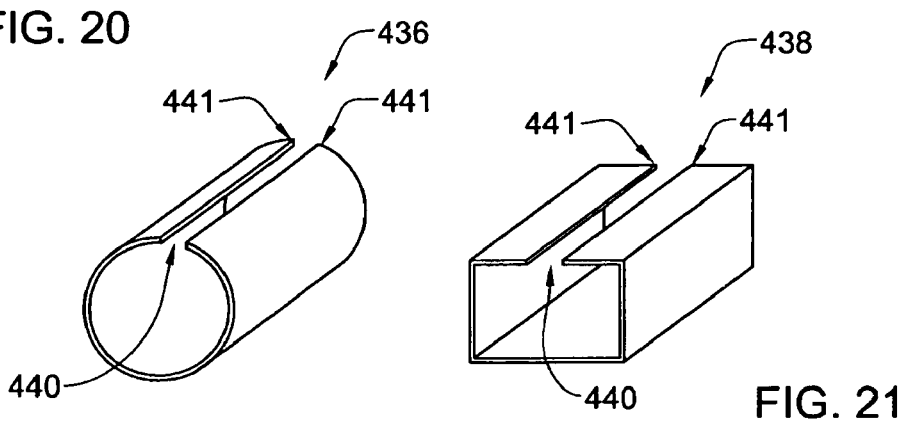
FIG. 21 is a schematic view of examples of expansion sleeves.

However, in reality apertures in components may become deformed due to use and may not perfectly match any regular shape. In FIG. 21, there is illustrated two examples of expansion sleeves designed for insertion into deformed apertures.

The sleeves shown are a sleeve with a C-shaped cross-section 436 and a sleeve with a square-shaped cross-section 438. Such sleeves may, of course, have a cross-sectional shape which corresponds to the original cross-sectional shape of a deformed aperture within which they are to be inserted. Both sleeves (436,438) shown are formed with an axial slot 440 running the entire length thereof, between longitudinal edges 441 of the sleeve.

Figure 22A:
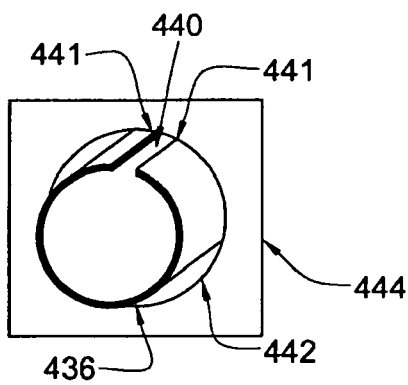
FIG. 22A is a schematic view of a mast crane section with an example expansion sleeve inserted in a deformed aperture thereof.
Figure 22B:
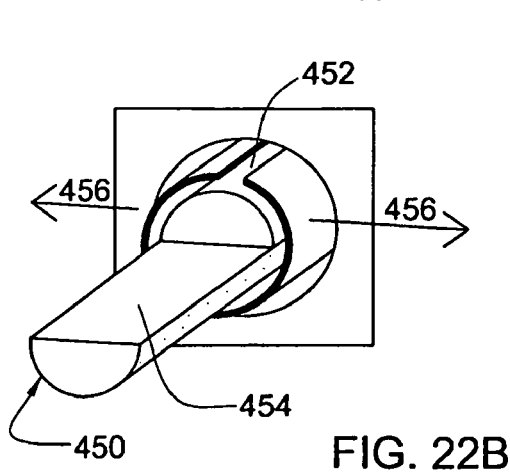
FIG. 22B is a schematic view of the mast crane section and expansion sleeve in FIG. 22A, with a pin, in unlocked-open mode, partially disposed inside the sleeve.
Figure 22C:
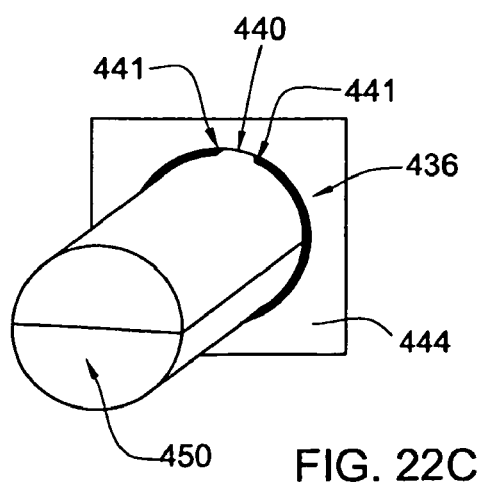
FIG. 22C is a schematic view of the mast crane section, expansion sleeve and pin in FIG. 22B, with the pin, in closed mode.

FIGS. 22A-22C illustrates the use of coupling assembly comprising an expansion sleeve together with a pin of the type described above to couple a construction component.

In FIG. 22A a component 444, which in this example is a portion of a crane mast, to be coupled is illustrated with a roughly circular deformed aperture 442 formed therewith. The C-shaped cross-sectional expansion sleeve 436 made of steel is inserted in the aperture 442.

Turning now to FIG. 22B, a pin, generally designated as 450, comprising a solid steel riding member 452 and a solid steel carriage member 454, is shown with the carriage member 454 subsequently inserted through the sleeve 436 and the aperture 442. The riding member 452 is subsequently slid along the carriage member 454 and expands the sleeve 436 and the edges 441 thereof outwardly in the direction of arrows designated as 456.

Referring now to FIG. 22C, the pin 450 is shown in closed position and the sleeve 436 has expanded to fill any gaps in the deformed aperture 442. Thus without the need for welding the aperture 442 is now filled with a solid steel coupling assembly substantially free of voids, at least along a load-bearing portion thereof.

Figure 23A:
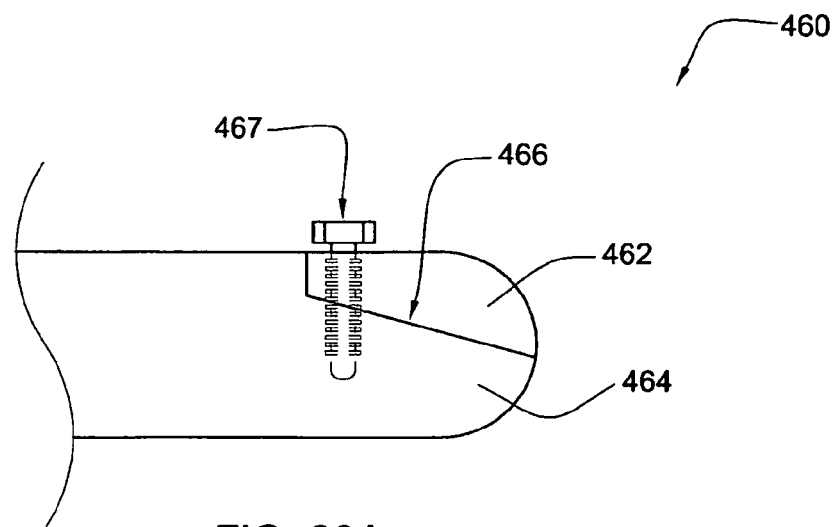
FIG. 23A is a longitudinal view of yet another example of a pin, in locked-closed mode, comprising an extended carriage member.
Figure 23B:
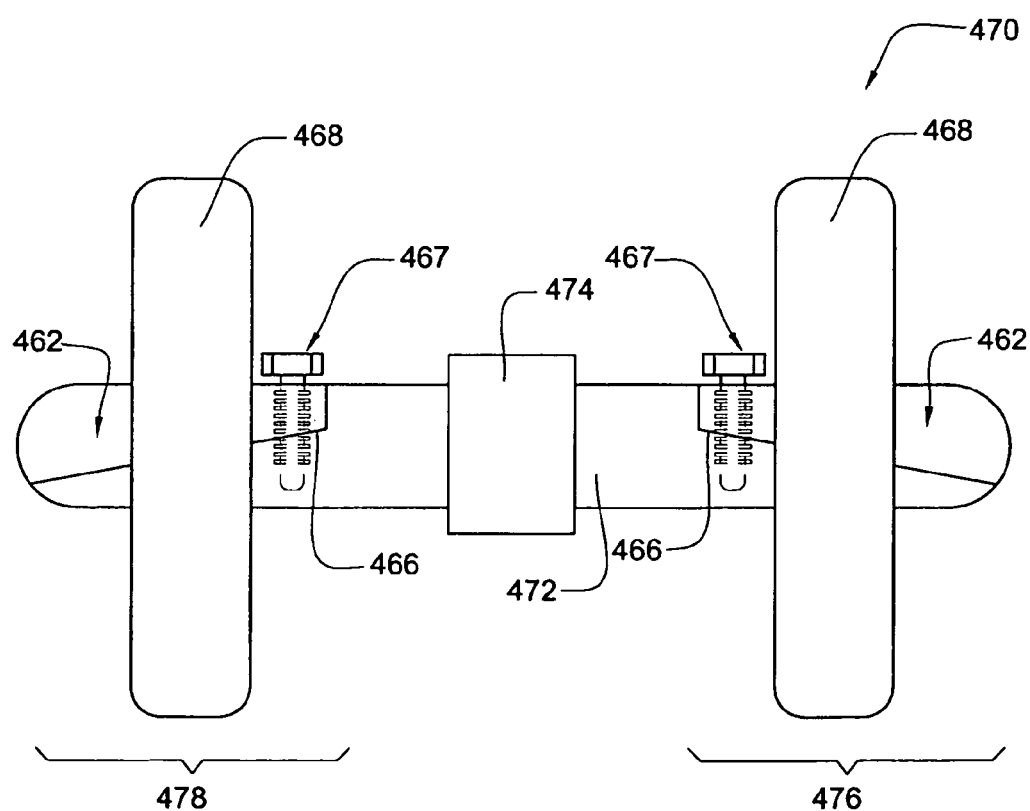
FIG. 23B is a longitudinal view of still a further example of a pin, in locked-closed mode, being used as a vehicle axle and comprising an extended carriage member and two riding members.

In FIGS. 23A and 23B, there are pins shown which comprise extended carriage members.

In FIG. 23A there is illustrated a pin, generally designated as 460, comprising a riding member 462, an extended carriage member 464 and a locking mechanism 467. The riding member 462 is slidable over the carriage member with both being mutually inclined longitudinally along edge 466, and together complimenting each other to form a uniform pin. The locking mechanism 467 is in the form of a threaded bolt which is insertable into correspondingly threaded coaxial bores (not shown) formed in the riding member 462 and extended carriage member 464, for holding the members (462,464) together in the shown locked-closed mode. However it should be noted that any suitable locking mechanism, such as those described above may be used.

The advantage of the extended carriage member 464, is that it allows the pin to provide an additional function via the end of the pin distal from the riding member (not shown). Such additional function may for example be the coupling of another component (not shown) to the distal end of the pin 460.

For example, referring to FIG. 23B, there is illustrated a pin, generally designated as 470, comprising two riding members 462 mounted on two ends of an extended carriage member 472, and comprising a locking mechanism 467 for each riding member 462. The extended carriage member 472, with the exception of the end portions thereof, is substantially cylindrical, having a first end 476 and a second end 478. When the riding members 462 are both in load-bearing position as shown in FIG. 23B the carriage member 472 and the riding members 462 together form a cylindrical shape. The pin 470, in this example, is shown being used as a vehicle axle and coupling a wheel 468 at each end thereof and a gear 474 at a central portion thereof. Each wheel 468 may be easily removed from the pin 470 by first removing the adjacent locking mechanism 467 and subsequently the adjacent riding member 462 thereto.

Notably, the locking mechanism 467 described with respect to FIGS. 23A and 23B are threaded to prevent them accidentally falling out during rotation of pins such as those described. As should be understood, any suitable, known constructional design which would prevent accidental detachment may be used, and in applications where rotation is not anticipated, no such constructional feature may be necessary.

It should therefore be noted that the riding member and carriage member of a pin may also perform other functions in addition to mere coupling and withstanding of shear forces, such as the transmission of torque as demonstrated in the example above. Additionally, in view of the above example, it is clear that such a pin may comprise more than one riding member.

Those skilled in the art to which this invention pertains will readily appreciate that numerous changes, variations and modifications can be made without departing from the scope of the invention mutatis mutandis.

The invention claimed is:

1. A coupling pin for fastening together multiple sections, said pin comprising:
   a carriage member; and
   a riding member, longitudinally slidable over said carriage member,
   said carriage member and said riding member being mutually inclined longitudinally, and together complimenting each other to form a uniform pin,
   wherein at least one of said carriage member and said riding member comprises:
   (i) a front support ring, adapted for positioning and securing said riding member to said carriage member; and
   (ii) a rear support ring, adapted for positioning and securing said riding member to said carriage member, and
   wherein said pin is configured to be inserted into an aperture through said sections, said pin is configured to be displaced into a load-bearing position by an external axial force applied at one end of said riding member, whereby said carriage member substantially overlaps said riding member, and said pin is configured to be displaced into an insertion/retraction position by an opposite external axial force applied at the other end of said riding member, whereby said carriage member is axially shifted with respect to said riding member.

2. A coupling pin according to claim 1, wherein said pin comprises a load-bearing body portion which has a cross-sectional dimension at said load-bearing position which is of greater magnitude than the cross-sectional dimension of said load bearing body portion at said axially shifted insertion/retraction position.

3. A coupling pin according to claim 2, wherein said load bearing body portion is constituted by said carriage member and said riding member and is solid, said load bearing body portion being substantially free of voids when in said load bearing position.

4. A coupling pin according to claim 1, comprising a head portion, a load-bearing body portion and a base portion.

5. A coupling pin according to claim 1, further comprising a locking mechanism adapted for securing said riding member to said carriage member in said load-bearing position.

6. A coupling pin according to claim 5, wherein said riding member and said carriage member are formed with coaxial axial or radial bores adapted to allow insertion of the locking mechanism into said bores.

7. A coupling pin according to claim 6, wherein said bores are axial bores and said locking mechanism is in the form of a threaded cylindrical member having a head portion adapted to be rotated by a tool.

8. A coupling pin according to claim 7, further comprising a tool adapted for rotating the head portion of said locking mechanism and said riding member and said carriage member are formed with coaxial bores adapted to receive said tool for storage and locking of said pin.

9. A coupling pin according to claim 5, wherein the carriage member is formed with a bore, and said riding member is formed with a slot, and said locking mechanism is in the form of a key member lockingly engageable through the slot for arresting the riding member to the carriage member at either of its respective positions.

10. A coupling pin according to claim 1, wherein said riding member and said carriage members are formed to have external threading adapted to allow engagement of the locking mechanism.

11. A coupling pin according to claim 10, wherein said external threading is formed with portions of said riding member and said carriage member which form a cylindrical shape when complimenting each other and said locking mechanism is in the form of a ring formed with internal thread matching the external thread, wherein when the ring is rotated it causes the riding member to be halted or moved relative to said carriage member.

12. A coupling pin according to claim 1, wherein said riding member protrudes slightly forward of said carriage member in said load-bearing position.

13. A coupling pin according to claim 1, wherein said carriage member and said riding member are axially displaceable along substantially flat and smooth mating surfaces.

14. A coupling pin according to claim 1, wherein a rear portion of said riding member comprises a radial projection, and wherein a rear portion of said carriage member comprises a ring member shaped correspondingly for axially arresting said radial projection of said riding member at said load-bearing position.

15. A coupling pin according to claim 14, wherein the pin comprises a tapered head portion and wherein said carriage member comprises a front arresting ring member at said head portion for arresting said riding member at said load-bearing position.

16. A coupling pin according to claim 15, wherein said riding member comprises a peripheral recess for engagement with said front arresting ring member.

17. A coupling pin according to claim 1, wherein said pin is part of a coupling assembly including an expansion sleeve adapted to expand into an aperture.

18. A coupling pin according to claim 17, wherein when said pin is in load-bearing position within said sleeve the coupling assembly forms a solid unit, substantially free of voids at least along a load-bearing portion.

19. A coupling pin according to claim 1, wherein said carriage member is an extended carriage member having a first end and a second end and said riding member is mutually inclined longitudinally with the first end to form a uniform pin.

20. The coupling pin according to claim 19, wherein said carriage member is substantially cylindrical and comprises a second end distal from the first end, and wherein said pin further comprises an additional riding member adapted to be mutually inclined longitudinally with said second end to form a uniform pin.

21. A coupling pin according to claim 1, wherein said carriage member is a solid steel carriage member, and wherein said riding member is a solid steel riding member.

22. The coupling pin according to claim 21, wherein said pin further comprises an additional riding member adapted to be longitudinally slidable over said second end to form a uniform pin.

23. A method for insertion of a pin into an aperture through multiple sections, the method comprising the following steps:
 a) providing a pin comprising a carriage member and a riding member longitudinally slidable over said carriage member, said carriage member and said riding member being mutually inclined longitudinally, and together complimenting each other to form a uniform pin, wherein at least one of said carriage member and said riding member comprises: (i) a front support ring, adapted for positioning and securing said riding member to said carriage member; and (ii) a rear support ring, adapted for positioning and securing said riding member to said carriage member, the pin being displaced into a load-bearing position by an external axial force applied at one end of said riding member, whereby said carriage member substantially overlaps said riding member, and said pin being displaced into an insertion/retraction position by an opposite external axial force applied at the other end of said riding member, whereby said carriage member is axially shifted with respect to said riding member;
 b) inserting the pin in the insertion/retraction position into said aperture, such that said carriage member is disposed in said aperture; and
 c) applying an external axial force to said riding member such that said riding member is displaced longitudinally with respect to the carriage member, into said load-bearing position.

24. The method according to claim 23, further comprising a step of locking the pin in said load-bearing position, thereby fastening the pin within said aperture.

25. The method according to claim 23, wherein said pin comprises a load-bearing body portion with a nominal cross-sectional dimension dimensioned to fit a cross-sectional dimension of said aperture, said load-bearing body portion being constituted by both a portion of said carriage member and a portion of said riding member.

* * * * *